Dec. 5, 1944.  E. A. LINK  2,364,539
CELESTIAL NAVIGATION TRAINER
Filed Dec. 28, 1942  11 Sheets-Sheet 1

EDWIN A. LINK
*INVENTOR.*

BY Donald T. Hillier

ATTORNEY.

EDWIN A. LINK
*INVENTOR.*
BY Donald V. Hillier
ATTORNEY.

EDWIN A. LINK
INVENTOR.

BY *Donald T. Hillier*

ATTORNEY.

EDWIN A. LINK
*INVENTOR.*

BY Donald V. Hillier

ATTORNEY.

Dec. 5, 1944.    E. A. LINK    2,364,539
CELESTIAL NAVIGATION TRAINER
Filed Dec. 28, 1942    11 Sheets-Sheet 5

EDWIN A. LINK
INVENTOR.
BY Donald T. Hillier
ATTORNEY.

Dec. 5, 1944.　　　　E. A. LINK　　　　2,364,539
CELESTIAL NAVIGATION TRAINER
Filed Dec. 28, 1942　　11 Sheets-Sheet 6

EDWIN A. LINK
INVENTOR.
BY Donald V. Hillier
ATTORNEY.

Dec. 5, 1944.  E. A. LINK  2,364,539
CELESTIAL NAVIGATION TRAINER
Filed Dec. 28, 1942  11 Sheets-Sheet 7

EDWIN A. LINK
*INVENTOR.*
BY Donald V. Hillier

ATTORNEY.

Dec. 5, 1944.  E. A. LINK  2,364,539
CELESTIAL NAVIGATION TRAINER
Filed Dec. 28, 1942  11 Sheets-Sheet 8

EDWIN A. LINK
*INVENTOR.*
BY Donald V. Hillier
ATTORNEY.

Dec. 5, 1944.  E. A. LINK  2,364,539
CELESTIAL NAVIGATION TRAINER
Filed Dec. 28, 1942  11 Sheets-Sheet 10

EDWIN A. LINK
*INVENTOR.*

BY *Ronald V. Hillier*

ATTORNEY.

Dec. 5, 1944.  E. A. LINK  2,364,539
CELESTIAL NAVIGATION TRAINER
Filed Dec. 28, 1942  11 Sheets-Sheet 11

EDWIN A. LINK
INVENTOR.
BY
ATTORNEY.

Patented Dec. 5, 1944

2,364,539

UNITED STATES PATENT OFFICE 2,364,539

CELESTIAL NAVIGATION TRAINER

Edwin A. Link, Binghamton, N. Y.

Application December 28, 1942, Serial No. 470,344

53 Claims. (Cl. 35—12)

My invention relates to training devices and is a continuation in part of my co-pending application Serial No. 250,958 filed January 14, 1939.

It is a general object of my present invention to provide in combination with a grounded aviation trainer means whereby a student navigator in a grounded aviation trainer or equivalent device may take sextant observations upon the stars of a simulated celestial sphere in order that he may determine an assumed position upon the earth's surface.

It is a more specific object of my invention to provide in combination with a grounded aviation trainer or equivalent device a simulated celestial sphere which may be made to rotate about said trainer or equivalent device in simulation of the apparent rotation of the celestial sphere about the earth caused by a rotation of the earth upon its axis.

It is another object of this invention to provide in combination with a grounded aviation trainer or equivalent device a simulated celestial sphere which may be made to rotate about said trainer or equivalent device in simulation of the apparent rotation of the celestial sphere about the earth caused by a change in the longitudinal position of the observer.

It is a further object of this invention to provide in combination with a grounded aviation trainer or equivalent device a simulated celestial sphere which may be made to rotate about said trainer or equivalent device in simulation of the apparent rotation of the celestial sphere about the earth, which rotation is the result of the apparent rotation caused by the turning of the earth upon its axis as modified by the apparent rotation caused by a changing of the observer's longitudinal position upon the earth.

Another object of my invention is to provide in combination with a grounded aviation trainer or equivalent device a celestial sphere which may be made to change its position relative to said trainer or equivalent device in simulation of the apparent rotation of the celestial sphere about the earth caused by a change in the latitudinal position of the observer.

It is another object of my invention to provide means whereby a simulated celestial sphere may be made to change its position relative to a grounded aviation trainer or equivalent device according to the passage of time, a change in the longitudinal position of the observer as well as a change in the latitudinal position of the observer.

Numerous other objects and advantages of my invention will become apparent as the description proceeds, reference now being made to the accompanying drawings in which like reference numerals indicate like parts. In the drawings, Fig. 1 is a general side view showing the base, turning means, tower, trainer, simulated celestial sphere, operator's desk, means for changing the position of the celestial sphere relative to the trainer, as well as the building in which the apparatus is housed.

Fig. 11 is a view of one of the collimators which form an important part of this invention.

Figure 1:
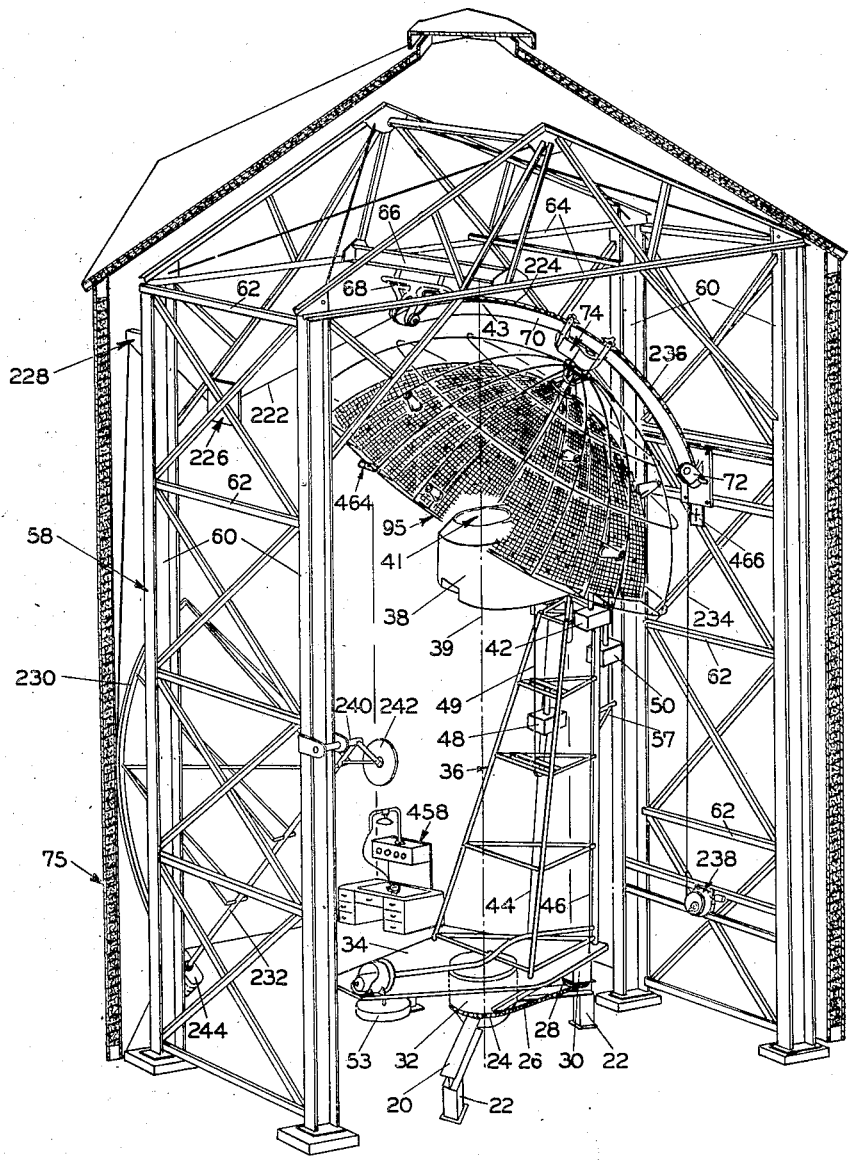

Reference is made to Fig. 1 which is a general side view of the trainer which forms the subject matter of this invention. It will be seen that there is provided a triangular supporting base 20 having suitable supporting legs 22. Formed integrally with this triangular supporting base is a pulley wheel 24 around which is placed an endless belt 26, which endless belt is also placed around a wheel 28 mounted upon the output shaft (not shown) of a turning motor 30.

Figure 9:
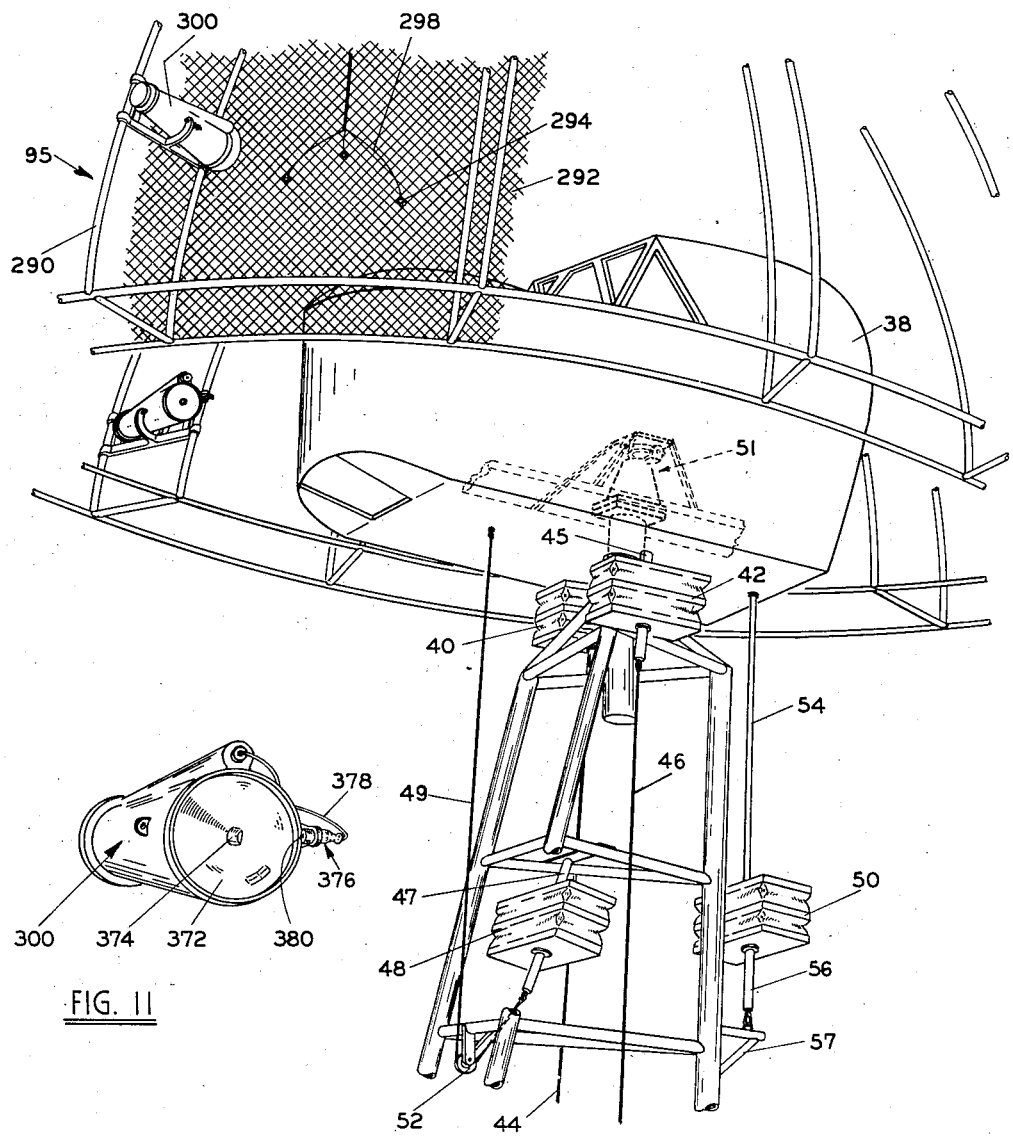
Fig. 9 is a detailed view of certain parts of the trainer and simulated celestial sphere.

Positioned above the central portion of the triangular base 20 is a central hub 32 and fixedly mounted upon the upper end of this hub is a platform 34. Hub 32 contains a suitable bearing arrangement in its lower part just above pulley wheel 24 so that the upper portion of the central hub 32 and platform 34 may rotate while its lower portion and the wheel 24 remain fixed as does triangular support 20. Because turning motor 30 is rigidly affixed to platform 34, it will be understood that whenever the output driving wheel 28 of this turning motor is made to rotate the arrangement of endless belt 26 and wheel 24 will cause platform 34 to rotate about its vertical axis. The direction of rotation of platform 34 will, of course, depend upon the direction of turning of the output wheel 28 of turning motor 30. Rigidly mounted upon platform 34 is a tower assembly 36, and, as seen in Fig. 9, at the upper end of which is a universal joint 51 upon which is mounted the trainer fuselage 38. It will be readily understood, therefore, that whenever, through the action of turning motor 30 the platform 34 is made to rotate, the trainer fuselage 38 will likewise respond. Means for causing turning motor 30 to rotate platform 34 and trainer fuselage 38 in response to the aircraft simulating controls within fuselage 38 in exact simulation of the turning of a plane in actual flight in response to movements of the controls within the plane are fully described and disclosed in my issued U. S. Patents 1,825,462 and 2,099,857.

It is to be noticed that supporting tower 36 is not mounted so that its vertical axis coincides with the axis of rotation 39 of central hub 32, but rather the tower is eccentrically mounted relative thereto. However, trainer fuselage 38 is mounted upon tower 36 in such a manner that the navigator's post 41 is directly above the axis of rotation 39 of central hub 32, and therefore, whenever the trainer fuselage is turned it rotates about the navigator's post 41. The axis of rotation of central hub 32 therefore coincides with the axis of rotation of fuselage 38, and, furthermore, these axes if extended would intersect the dome rail 70 at its highest point, or zenith, 43. A weight 53 balances the platform and trainer mounted thereupon.

It will be seen in Figs. 1 and 9 that there are two collapsible-expansible bellows 40 and 42, the former of which is under the right side of the trainer fuselage 38 while the latter is located under the left side of the fuselage. The upper side of bellows 42 is attached to the left underside of fuselage 38 by means of link 45 and the upper side of bellows 40 is similarly connected to the under right side of the fuselage. Attached to the bottom of bellows 40 is a cable 44, the other end of which is suitable attached to platform 34 while a cable 46 is attached to the under side of bellows 42 and to platform 34. Inasmuch as the universal joint 51 upon which the trainer is balanced lies between these two bellows, it will be understood that whenever bellows 40 is collapsed and bellows 42 is expanded the trainer fuselage will be made to bank toward the right while if bellows 42 be collapsed and bellows 40 be expanded the fuselage will bank toward the left. A detailed disclosure of means for collapsing one of these bellows and simultaneously expanding the other in response to the movement of controls within the trainer fuselage 38 so that the fuselage 38 may be made to bank as a result of the movement of controls therein in exact simulation of the banking of a plane in actual flight in response to the movement of its controls may be found in the above-mentioned U. S. Patents 1,825,462 and 2,099,857.

In Figs. 1 and 9 there are also shown two other bellows 48 and 50. The upper portion of bellows 48 is suitably attached by means of link 47 to a portion of the tower 36 and attached to the lower end of this bellows is cable 49 which runs through a pulley 52 mounted upon the tower 36 as shown. The upper end of this cable is attached to the lower side of fuselage 38 immediately ahead of the previously mentioned universal joint 51. A rigid connecting rod 54 has its upper end attached to the lower side of fuselage 38 and its lower end attached to the upper side of bellows 50, and another rod 56 has its upper end attached to the lower side of bellows 50 and its lower end attached to a short extension 57 mounted upon the tower assembly 36. Inasmuch as the universal joint 51 lies between the points at which the upper end of cable 49 and connecting rod 54 are attached to the lower side of fuselage 38, it will be understood that whenever bellows 48 is collapsed and bellows 50 expanded, the trainer fuselage will assume a position in simulation of the diving of a plane in actual flight. On the other hand, if bellows 50 be contracted and bellows 48 expanded, fuselage 38 will assure a climbing attitude. United States Patents 1,825,462 and 2,099,857 also disclose in detail means for causing the trainer fuselage to assume a diving or climbing attitude in response to the movements of the controls within the fuselage in the same manner that a plane in actual flight assumes corresponding attitudes in response to the movements of its controls.

Also shown in Fig. 1 is an extensive steel framework 58 comprising essentially four upright members 60 having suitable cross pieces 62 and two horizontal supporting members 64 each of which rest upon two of the upright members 60 and run in a direction which may be arbitrarily designated north-south. Supported by these two members 64 and running east-west is a cross piece 66 which has integrally formed therewith depending lug 68 which holds the south end of the dome rail 70. The north end of the dome rail 70 is supported by a dome bracket 72 which is suitably held by some of the cross pieces 62 of the steel framework. Dome gear box 74 is suspended from the dome rail 70 by means of depending lugs to be later described.

Figure 2:
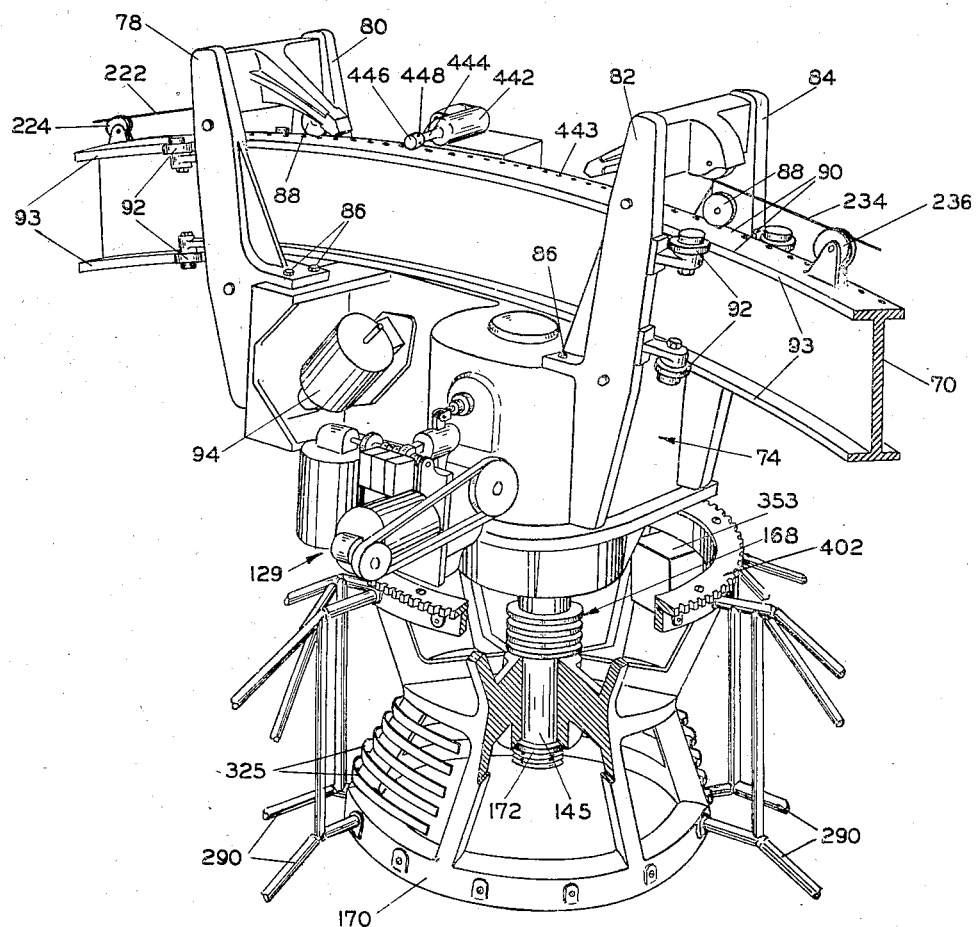
Figs. 2 and 3 are detailed views of the dome rail, dome gear box and related parts.
Figure 3:
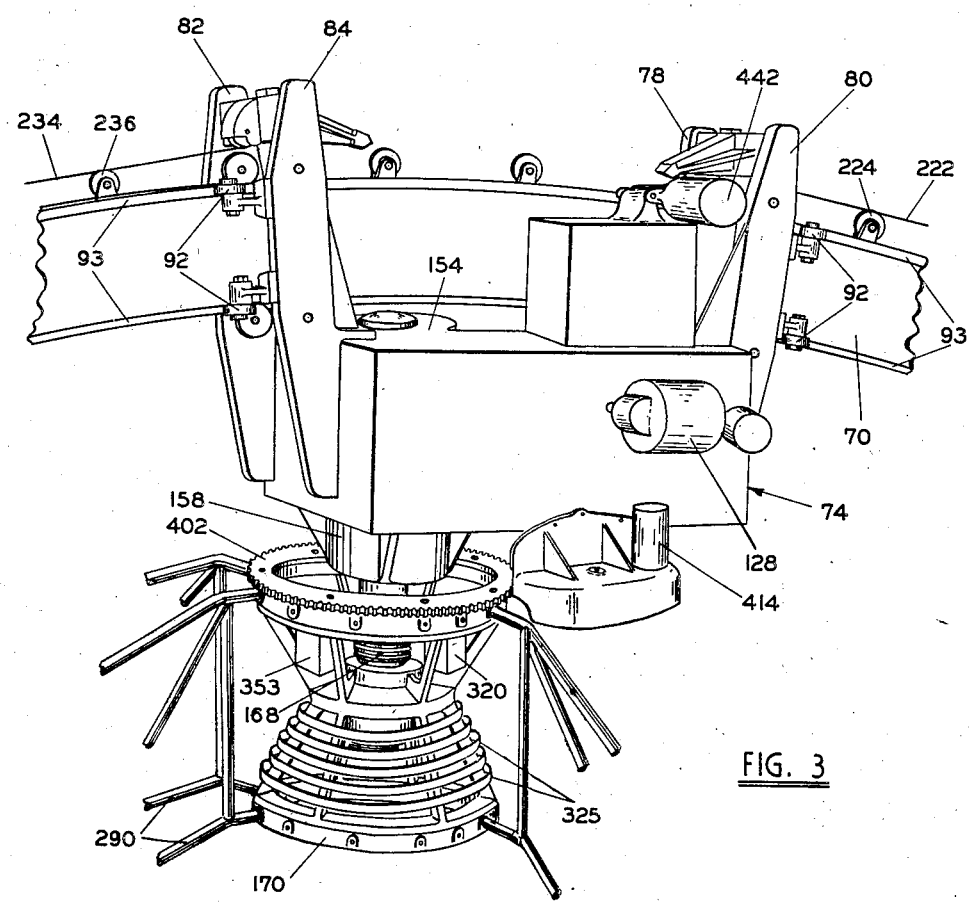

Reference is now made to Figs. 2 and 3 which show in detail the method of suspension of the dome gear box 74 from the dome rail 70. It will be seen in Fig. 2 which shows the side of the dome gear box 74 seen in Fig. 1 that four depending lugs 78, 80, 82, and 84 are attached by suitable bolts 86 to the dome gear box. Fig. 3 shows the other side of dome gear box 74. Rollers 88 roll along suitable trackways 90 on the upper side of the dome rail 70 and therefore, the dome gear box 74 may assume any position along dome rail 70. Rollers 92 have suitable trackways 93 along the sides of the dome rail 70 and therefore make easier the desired movement of the dome gear box along the dome rail. It will be seen that my simulated celestial sphere 95 is attached to dome gear box 74 so that the simulated celestial sphere moves along dome rail 70 with the dome gear box 74. Although member 95 as disclosed simulates only a portion of the celestial sphere it should be understood that my invention is not restricted to a device simulating approximately the same proportion as shown in Fig. 1, but selectively may include devices which simulate a much larger or smaller part of the celestial sphere. The entire invention is in a suitable building 75.

*Means for rotating simulated celestial sphere in simulation of apparent rotation of real celestial sphere about the earth due to rotation of earth upon its axis (passage of time) and change in an observer's longitudinal position*

Figure 5:
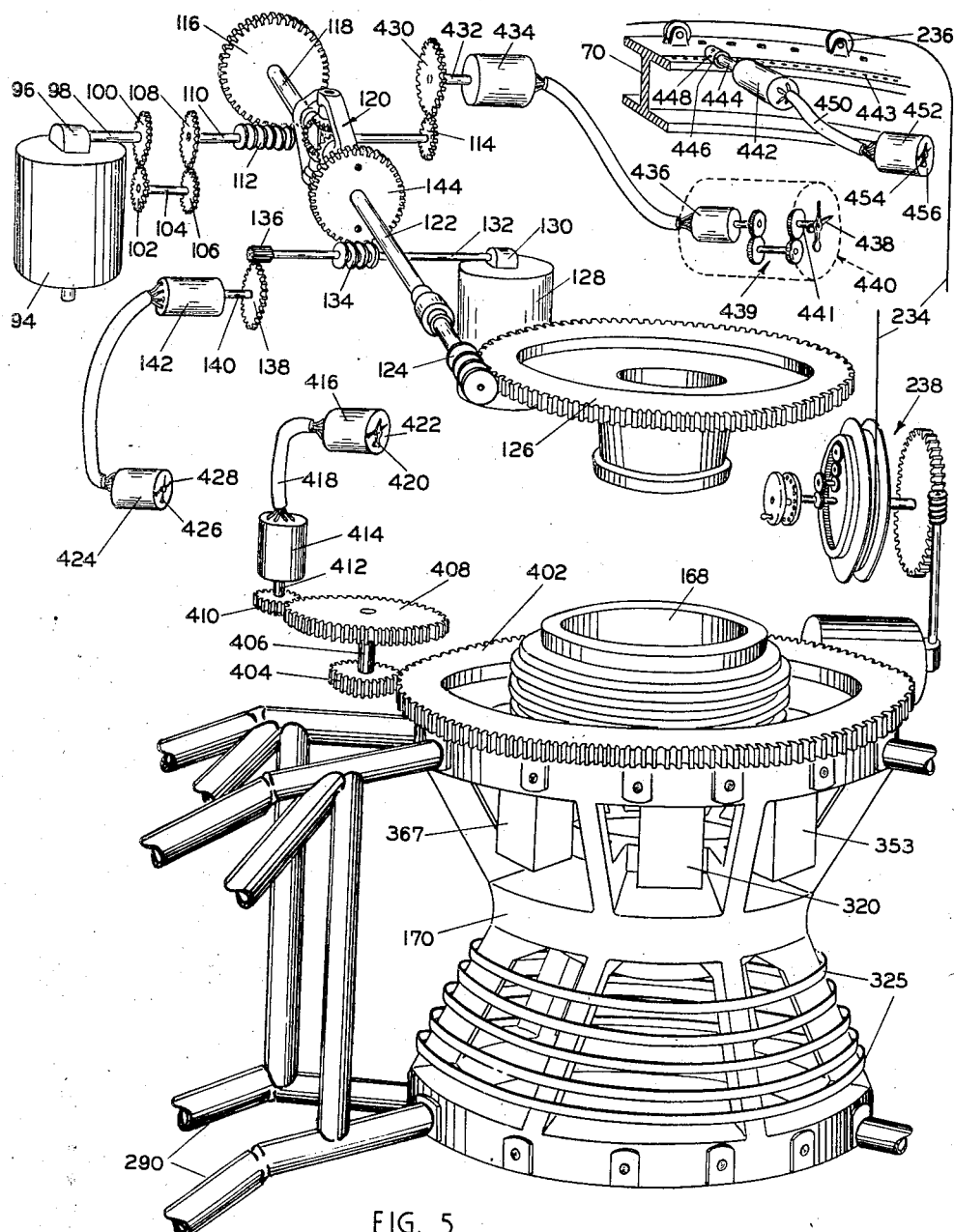
Fig. 5 is an exploded view of the systems for driving the simulated celestial sphere and means for actuating the indicators.

Reference is now made to Fig. 5 which shows much of the detailed mechanism of this invention. It will be seen in that figure that there is provided a time drive motor 94 which is of the constant speed synchronous type. In the top of this motor there is a suitable reduction gearing system 96 so that the output shaft 98 turns at the speed of two revolutions per minute, and therefore, the gear 100 which is rigidly mounted upon the end thereof will rotate at the same rate. This gear preferably has 51 teeth and is in mesh with a second gear 102 which preferably has 49 teeth. Gear 102 is rigidly affixed to shaft 104 which has rigidly mounted upon its other end a third gear 106 having 79 teeth, and gear 106 in turn is in mesh with a fourth gear 108 which has 82 teeth. This last mentioned gear is rigidly mounted upon the end of shaft 110 which has integrally formed therewith a worm 112 and which shaft has rigidly affixed to its other end a gear 114. The worm 112 is in working relation with worm gear 116 which is rigidly affixed to a shaft 118 which is the primary drive of the differential 120. The output shaft 122 of the differential 120 makes one rotation for each rotation of the input shaft 118, except when the secondary drive 144 of the differential works. Output shaft 122 has rigidly affixed to its end worm 124 which in turn is in engagement with worm gear 126 which is known as the main drive gear.

A second motor 128 which is known as the longitude drive motor is a series motor reversible and of the variable speed type. This motor has at its upper end suitable reduction gearing 130 and the output shaft 132 thereof has integrally formed therewith a worm 134 while at the end of the output shaft in a pinion 136 which is in mesh with a gear 138 which is rigidly mounted upon the central shaft 140 of the longitudinal transmitter teletorque designated generally as 142. It will be later shown that connected to transmitter teletorque 142 is a receiver teletorque and connected to each of the other transmitter teletorques hereinafter described in a corresponding receiver teletorque. The transmitter and receiver teletorques of each system are connected in a manner well understood in the art so that the output shaft of the receiver teletorque rotates in the desired direction through the same angle as the input shaft of the transmitter teletorque. The worm 134 which is integral with the output shaft 132 works in relation to worm gear 144 which is rigidly affixed to the yoke of differential 120. The output shaft 122 of differential 120 is movable inside gear 144. It will therefore be realized that worm gear 144 is a secondary drive to differential 120 and that the shaft 122 gives an output which is the resultant of the driving of time drive motor 94 and the longitude drive motor 128.

In order that the utility of the above-described system will be appreciated, reference must be made to the fundamental principles of celestial navigation.

Ordinary civil time is based on the rotation of the earth with respect to the sun, the civil day being the average period of time required for one complete revolution. The sidereal day is defined as the length of time required for the earth to make one complete rotation with respect to the stars. Because the earth is moving in a path around the sun at the same time that it is turning upon its axis, for 365 civil days there are 366 sidereal days, or the civil day is longer than the sidereal day by an amount equal to about 3 minutes 56 seconds. This being true, it will be realized that the celestial sphere apparently makes one complete rotation about the terrestrial sphere in less than 24 hours or, expressing it in another manner, the celestial sphere makes an apparent rotation about the earth of 360° 59' in 24 hours of ordinary civil time.

This being the case, it is evident that the simulated celestial sphere 95 which forms an important part of my invention must be made by the time drive motor 94 and intermediate gearing mechanism to rotate through exactly 360° 59' in 24 hours. This difference between the length of a civil day and the length of a sidereal day makes necessary the employment of the gears mentioned above 100, 102, 106 and 108 which gears are referred to as the time transfer mechanism. By providing a ratio between worm 124 and the main drive gear 126 in the first instance, and a ratio between worm 112 and worm gear 116 in the second instance such that two revolutions per minute of the shaft 110 will rotate the main drive gear 126 through exactly 360° in 24 hours, it is evident that if gear 108 and shaft 110 are driven at the correct rate slightly in excess of two revolutions per minute, the main drive gear 126 and simulated celestial sphere 95 can be made to rotate through exactly 360° 59' in 24 hours. By the employment of gears 100, 102, 106 and 108, each of which has the number of teeth mentioned above, the output of time drive motor 94 as represented by the number of revolutions per minute made by its output shaft 98 is increased so that the speed of shaft 110 is to the speed of shaft 98 as 360° 59' is to 360° and, therefore, the main drive gear 126, in the absence of any movement of the secondary drive 144 of differential 120 and simulated celestial sphere 95 will be made to rotate through 360° 59' in exactly 24 hours.

This being the case, it will be readily understood that upon energization of time drive motor 94 a movement will be imparted to my simulated celestial sphere 95 exactly equal to the apparent movement of the real celestial sphere about any given point on the earth's surface caused by the rotation of the earth upon its axis.

It will be readily understood that if an observer upon the surface of the earth be traveling westward, that is, in the same direction as the apparent traveling of the stars, the apparent motion of the stars will be decreased while if an observer be traveling eastward the apparent movement of the celestial bodies will be increased. Therefore, I have provided the longitude drive motor 128 to drive the worm 134 which in turn drives worm gear 144 and the yoke of differential 120. It will be readily realized that inasmuch as longitude drive motor 128 is of the series reversible variable speed type, the output of differential 120 due to the running of time drive motor 94 may be increased by driving motor 128 in one direction or decreased by driving it in the opposite direction, and the rotation of main drive gear 126 and the simulated celestial sphere 95 may be varied accordingly. Therefore the rotation of the simulated celestial sphere caused by the driving of time drive motor 94 may be increased or decreased according to the assumed direction of travel of an observer as well as according to the assumed speed of his travel. The electrical circuit and various controls of time drive motor 94 and longitude drive motor 128 will be discussed hereinafter.

Figure 4:
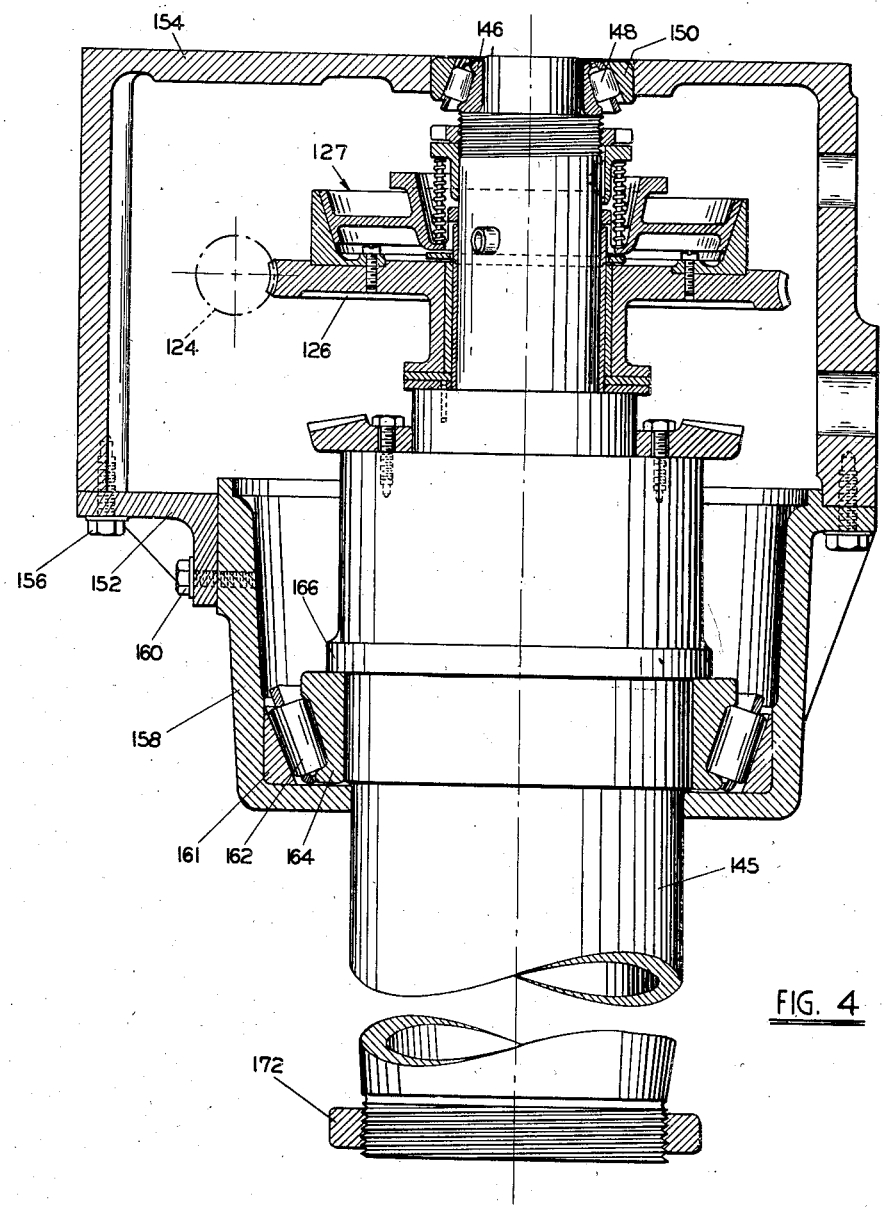
Fig. 4 is a partial cross sectional view of the dome gear box.

Reference is now made to Fig. 4 which is a detailed cross sectional view of a portion of the dome gear box 74. There is provided a central shaft 145 the upper end of which has rigidly affixed thereon a cone 146 and upon which in turn is mounted tapered roller bearing cage 148 which has around its outside cup 150. The bottom cover of the dome gear box is designated 152 and is attached to the top 154 by means of bolts 156 and has attached to its depending portion the bottom 158 of the dome gear box by means of bolts 160. The bottom 158 of the dome gear box 74 has mounted therewithin outer bearing race 161 which supports lower tapered bearing cage 162 and inside this cage is placed lower bearing cone 164. A shoulder 166 of central shaft 145 rests upon cone 164. It will therefore be realized that central shaft 145 is held within the dome gear box by the upward action of members 161, 162, and 164 and by the downward action of members 146, 148, and 150. The outside 154 of the dome gear box is suspended from the dome rail by means of the previously-described depending lugs 78, 80, 82 and 84.

It should be borne in mind that the presence of bearing cages 148 and 162 make it possible for central shaft 145 to rotate within the dome gear box.

It will be seen from Fig. 4 that the main drive gear 126 to which reference has been made in my discussion of Fig. 5 is within the dome gear box and that worm 124 which drives the same is also therein. Whenever worm 124 drives the main drive gear 126 central shaft 145 is made to rotate.

As seen in Fig. 4, worm 124 drives main drive gear 126 which in turn drives shaft 145 whenever the clutch designated generally by 127 is engaged. This clutch forms no part of the instant invention but for a full disclosure thereof reference is made to the copending application Serial Number 480,330, filed March 24, 1943. In Fig. 2 the clutch reset mechanism is designated generally by 129, and for a full disclosure thereof reference is made to the same copending application.

Central shaft 145 projects below the lower housing 158 of the dome gear box, and as best seen in Figs. 2 and 3, a collector ring assembly 168 is mounted on central shaft 145 below housing 158 and by means of a suitable set screw (not shown) is rigidly affixed thereto. Central shaft 145 immediately below collector ring assembly 168 begins to taper and the inside of the dome hub 170 is also tapered so that the dome hub 170 when pushed up on to central shaft 145 stops at the correct point. Nut 172 is then screwed onto the threaded lower end of shaft 145 and holds the inside tapered surface of hub 170 fast against the tapered lower portion of shaft 145. Therefore, whenever central shaft 145 is rotated dome hub 170 and the simulated celestial sphere 95 rotate therewith. As previously explained, central shaft 145 and simulated celestial sphere rotate in accordance with the output of differential 120, which output is the input resulting from the running of time drive motor 94 as modified by the running of time drive motor 94 as modified by the running of longitude drive motor 128. Therefore, simulated celestial sphere 95 may be made to rotate at the same rate that the real celestial sphere apparently rotates about an observer positioned at a fixed point upon the earth's surface, and such rotation may be modified to simulate the rotation of the real celestial sphere about an observer traveling at any speed, east or west, at any rate upon the earth's surface.

Figure 6:
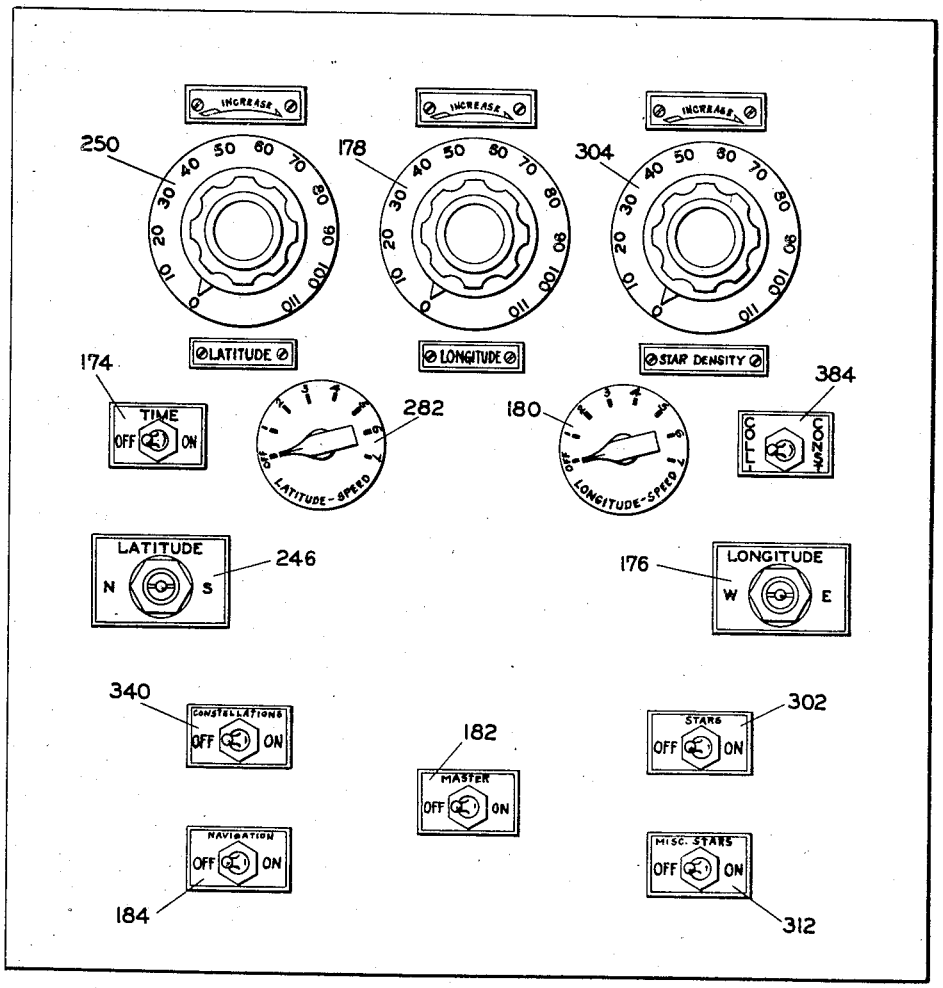
Fig. 6 is a view of the control panel.

Reference is now made to Fig. 6 which shows the operator's control panel. It will be seen that on that panel is a simple off-on switch 174 designated by the word "Time."

This switch controls time drive motor 94 and whenever it is in the "on" position, provided certain other switches be correctly positioned, as will hereinafter be described, time motor 94 drives, through the previously disclosed intermediate mechanism, main drive gear 126, and consequently, the simulated celestial sphere 95 rotates through exactly 360° 59′ in 24 hours. Simulated celestial sphere 95 will therefore rotate about the trainer at the same rate that the real celestial sphere apparently rotates about any given point on the earth's surface because of the turning of the earth upon its axis.

In Fig. 6 it will be seen that there is also provided longitude switch 176 having a neutral, W (west) and E (east) position as well as a longitude variac 178 and a longitude speed control 180. Also provided is a master switch 182 and a navigation switch 184.

Figure 7:
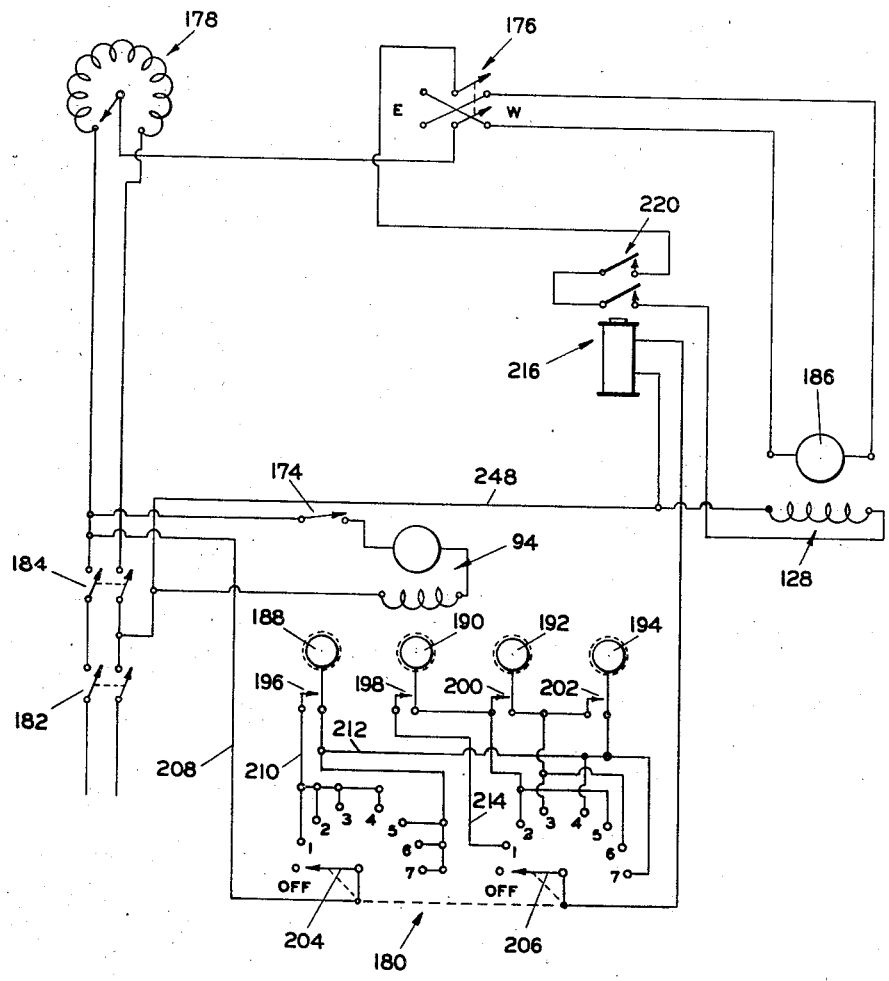
Fig. 7 is a diagrammatic view of the electrical system for controlling the longitude drive and time drive motors.

Reference is now made to Fig. 7 which shows in detail the electrical control system of the longitude drive motor 128. It will be seen that whenever the master switch 182 is in the "on" position and the navigation switch 184 is likewise positioned, current will flow through the longitude variac 178, and provided this variac be turned up, to the longitude direction switch 176. The term "variac" when used herein designates an auto-transformer with a continuously variable tap. The direction of flow through the armature 186 will depend upon whether the longitude direction switch 176 be on the side designated E or on the side designated W. Therefore, the direction of turning of longitude drive motor 128 will be determined by the position of switch 176, and the output of differential 120, seen in Fig. 5, will be increased or decreased by the position of longitude direction switch 176. Specifically, if an observer on the earth's surface were traveling in an easterly direction, the real celestial sphere would apparently rotate toward the west at a greater rate than if the observer were not traveling. Therefore, if it be assumed that the trainer be flying in an easterly direction, the simulated celestial sphere must be rotated at a greater rate of speed. This is accomplished by throwing the longitude direction switch 176 to the E position. Longitude drive motor 128 will therefore turn in such a direction that the output of differential 120 is increased and main drive gear 126 and the simulated celestial sphere will rotate at an increased rate.

On the other hand, if an observer were actually traveling in a westerly direction, the apparent rotation of the real celestial sphere would be decreased according to the speed of his travel. In order that this may be simulated with my invention, whenever it is assumed that the trainer is traveling toward the west the longitude direction switch 176 is placed in the W position and as a result the longitude drive motor 128 will turn in such a direction as to decrease the output of differential 120 and, therefore, main drive gear 126 and the simulated celestial sphere will turn at a rate slower than when time drive motor 94 is the only one running.

Referring to Fig. 7, it will be readily understood that by varying the position of longitude variac control 178 upon the control panel shown in Fig. 6, the speed of longitude drive motor 128 may be controlled.

A second means of controlling the speed of longitude drive motor 128 is also shown in Fig. 7. This control takes the form of a plurality of interrupter cams 188, 190, 192 and 194 which are rotated by any constant speed motor (not shown), the peripheral pattern of the cams alternately making and breaking the circuit at the points 196, 198, 200 and 202. Longitude speed control 180 shown in Fig. 6 is in reality a gang switch controlling the positions of selector arms 204 and 206. It will be seen that whenever master switch 182 and navigation switch 184 are closed, current will flow through the wire 208 and through selector arm 204. If longitude speed control 180 be in the "1" position, current will flow through wire 210 and whenever contact point 196 is closed by cam 188 through wire 212 and if contact point 202 is closed by cam 194 and contact point 200 is closed by cam 192 and contact point 198 is closed by cam 190, current will flow along conductor 214 through selector arm 206 and through longitude relay 216, then through wire 248 out through the master switch 182. It will therefore be realized that for longitude relay 216 to be energized when longitude speed control 176 is in the "1" position, all four of the cams 188, 190, 192 and 194 must be so positioned that the circuit is closed and, longitude drive motor 128 can run only when the longitude relay 216 is energized and the circuit is closed at the points 220.

Whenever longitude speed control 180 is placed in the "2" position, longitude relay 216 is energized only when cams 188, 194, and 192 simultaneously close the circuit, and therefore motor 128 can run only when these three cams are simultaneously so positioned.

Study of the cam control electrical circuits of Fig. 7 will show that the longitude motor may be made to run varying proportions of the time by changing the position of longitude speed control 180. Furthermore, the speed of the longitude drive motor 128 may be controlled by the position of longitude variac 178. These two variables make it possible to control the rotation of the output shaft 132 of the longitude drive motor 128 and therefore to modify the rate of rotation of the simulated celestial sphere as turned by the time drive motor 94. As stated previously, the speed and direction of the turning of the output shaft 132 of the longitude drive motor 128 will depend upon the assumed direction of travel of the trainer as well as the assumed speed thereof—the assumed rate of change of longitude of the trainer.

From the foregoing description it will be seen that by throwing the time switch 174 to the "on" position, the simulated celestial sphere will be made to rotate about the trainer at the same rate that the real celestial sphere rotates about a given point on the earth's surface. If the trainer is assumed to be going eastward or westward, by means of longitude direction switch 176, variac 178 and longitude speed control 180, the speed of rotation of the simulated celestial sphere may be increased or decreased by exactly the right amount so that the rate of turning of the real celestial sphere caused by one traveling in that direction and at that rate upon the earth's surface may be exactly simulated.

*Means for rotating simulated celestial sphere in simulation of apparent rotation of real celestial sphere about the earth due to a change in observer's latitudinal position*

In addition to the apparent rotation of the real celestial sphere about the earth caused by the turning of the earth upon its axis and by a change in the longitudinal position of the observer upon the surface of the earth, it will be understood that if an observer is traveling from north or south, i. e., if his latitudinal position be changing, the real celestial sphere will make an apparent rotation at right angles to the rotation caused by the rotation of the earth and the change in the longitudinal position of the observer. The following means have been incorporated in this invention in order that the apparent rotation of the real celestial sphere caused by a change in the latitudinal position of the observer may be simulated.

It can be seen in Fig. 1 that the dome rail has suspended thereupon the dome gear box 74 which in turn holds the simulated celestial sphere. It will be seen that as the dome gear box 74 is moved from the uppermost portion of the dome rail 70 toward the lower end the angular relationship of the simulated celestial sphere 95 to the trainer 38 and to the navigator's post 41 is changed.

The real north celestial pole is exactly above the real north terrestrial pole and in my invention the simulated north celestial pole is on the axis of the central shaft 145 of the dome gear box. When the simulated celestial sphere is exactly above the navigator's post 41 in the trainer 38 the simulated stars inside the simulated celestial sphere 95 bear the same relationship to the navigator's post 41 as the stars of the real celestial sphere bear to an observer positioned at the north terrestrial pole. At the north terrestrial pole the north celestial pole is in the zenith of the observer, that is, is directly overhead or has an elevation of 90°. If the observer were to travel toward the south terrestrial pole it will be realized that the north celestial pole will no longer be in the zenith of the observer but rather it will move toward his horizon, or expressing it in another manner, its altitude will decrease. It can be seen that by a movement of the dome gear box 74 down the dome rail 70 the simulated north celestial pole may be made to approach the horizon of the observer in the trainer and the altitude of this pole will decrease. Therefore, it is possible by moving the dome gear box 74 along dome rail 70 to simulate the rotation of the real celestial sphere caused by a change in the latitudinal position of the observer upon the surface of the earth.

As previously explained in our discussion of Figs. 2 and 3, the dome gear box 74 is suspended from the dome rail 70 by means of four lugs 78, 80, 82 and 84 and a plurality of rollers 88 and 92 facilitate movement of the gear box along the rail. Referring to Figs. 1, 2 and 3, it will be seen that attached to the lugs 78 and 80 is a cable 222 which travels in pulleys 224 which are mounted on the upper surface of dome rail 70. Cable 222 extends toward the south of the building, as seen in Fig. 1, and is in engagement with pulleys 226 and 228 which are suitably mounted upon the steel framework. Cable 222 then descends and travels along a suitable retaining track 230 on the arcuate outer portion of the dome counterweight sector 232. The cable is affixed to the dome counterweight sector near the weight 244.

A second cable 234 is attached to the other two depending lugs 82 and 84 which hold the dome gear box 74 and likewise travels along a plurality of pulleys 236 also suitably mounted on the upper surface of dome rail 70. This cable terminates at the latitude drive motor 238.

It will be noticed that the dome counterweight sector 232 is pivoted for movement about the point 240. A plurality of weights 242 and 244 are attached to the dome counterweight sector. It will be realized that when the dome gear box 74 and simulated celestial sphere 95 are positioned at the uppermost point or zenith of the dome rail 70 the dome gear box and celestial sphere will not have a tendency to roll down the dome rail. When the dome gear box and celestial sphere are in this position the dome counterweight sector is suspended in such a direction that a minimum of weight tends to prevent the dome gear box anad celestial sphere from traveling down the dome rail, but as the dome gear box 74 and celestial sphere 95 move down the dome rail 70 it will be readily understood that inasmuch as the direction of movement becomes increasingly perpendicular a greater force will have to be exerted upon the cable 222 in order to prevent the dome gear box 74 and simulated celestial sphere from traveling further down dome rail 70. Therefore, it will be seen that as the dome gear box 74 and simulated celestial sphere move down dome rail 70 weight 244 is moved from its vertical depending position to a more horizontal extended position, and therefore, a greater pull will be exerted upon cable 222 thereby preventing the dome gear box 74 and simulated celestial sphere from moving farther down dome rail 70. No matter what position dome gear box 74 and simulated celestial sphere 95 occupy along the dome rail 70, the dome counterweight sector always exerts sufficient pull on cable 222 to pull the gear box and attached sphere up the rail, in the absence of any other force tending to pull them down the rail.

In the event it is desired to move dome gear box 74 and simulated celestial sphere 95 down dome rail 70 sufficient pull is applied to cable 234 by means of the latitude drive motor 238 to overcome the tendency of dome gear box 74 and simulated celestial sphere to move up dome rail 70 as a result of the pull exerted upon cable 222 by dome counterweight sector 232.

Figure 8:
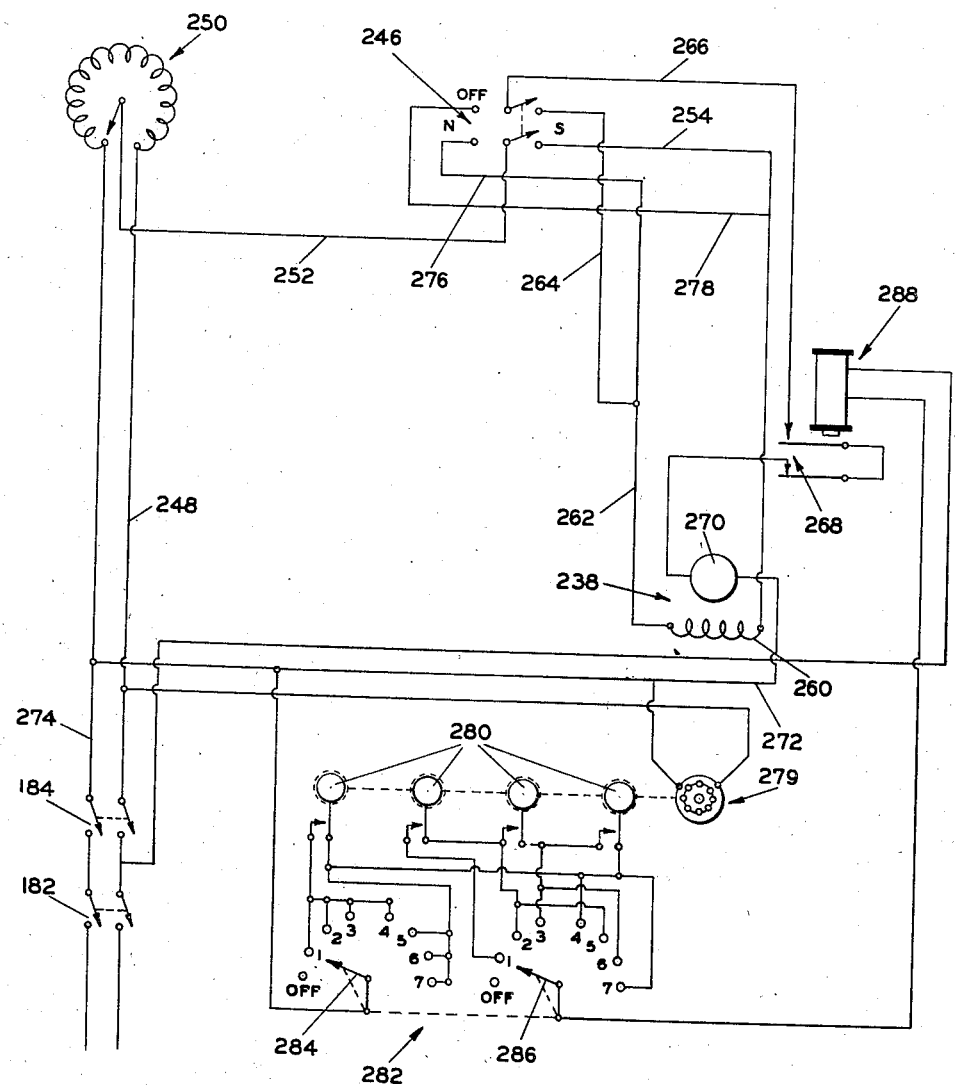
Fig. 8 is a diagrammatical view of the electrical system for controlling the latitude drive motor.

Reference is now made to Figs. 6 and 8 which disclose the means for controlling the position of gear box 74 and simulated celestial sphere 95 on dome rail 70 in order that the simulated celestial sphere may change its position relative to the observer's post within the trainer fuselage 33 in the same manner that the real celestial sphere changes its position relative to an observer whose latitudinal location upon the surface of the earth is changed.

It will be seen in Fig. 6 that there is provided a latitude switch 246 having a neutral, N (north) and S (south) positions. Assuming that the master switch 182 and the navigation switch 184 be closed, current will flow in through the switches and along conductor 248 through the latitude variac 250 and, if this variac be turned up, along wire 252. Assuming that latitude switch 246 be in the S position, current will flow along conductor 254 toward the bottom of Fig. 8 to the left through the coil 260 of latitude drive motor 238 and up conductor 262, along conductor 264 through latitude direction control switch 246 along conductor 266, down this same conductor through the latitude relay 268, if that relay be closed, through the armature 270 of latitude drive motor 238 and, by means of conductor 272, out to main line 274 and out through the navigation switch 184 and master switch 182. In the event that latitude control switch 246 be in the N position current will flow in through conductor 248 through variac 250 along conductor 252 and then at the latitude direction control switch 246 will be led along conductor 276, down conductor 262 and to the right through coil 260 of latitude drive motor 238, up conductor 254, along conductor 278 toward the left in Fig. 8 and through latitude direction control switch 246 along conductor 266, down conductor 266 to latitude relay 268, and if this relay be closed, to the right through the armature 270 of latitude drive motor 238, down and along conductor 272 to main line 274 and out through navigation switch 184 and master switch 182.

It is to be noted that when latitude direction control switch 246 is in the S position, current flows through the coil 260 of latitude drive motor 238 toward the left of Fig. 8, but when latitude direction control switch 246 be in the N position current through coil 260 is toward the right in Fig. 8. In both instances, current flows through armature 270 toward the right in Fig. 8. This reversing of current through coil 260, it will be understood, will reverse the direction of the output of latitude drive motor 238 and therefore, the dome gear box 74 and simulated celestial sphere can be made to move in either direction along dome rail 70. Specifically, if latitude direction control switch 246 be in the S position, latitude drive motor 238 pulls, by means of cable 234, the dome gear box 74 and simulated celestial sphere down dome rail 70, but in the event latitude direction control switch 246 be in the N position, latitude drive motor 238 has an output in a direction to release cable 234 and dome counterweight sector 232 will then pull dome gear box 74 and simulated celestial sphere up dome rail 70.

It is to be noted that whenever master switch 182 and navigation switch 184 be closed, cam drive motor 279 which is of the constant speed type will rotate interrupter cams 280 at a constant rate. These cams perform the same function that cams 188, 190, 192 and 194 perform in the longitude motor circuit. Latitude speed control 282, as seen in Fig. 6, is in reality a gang switch as seen in Fig. 8 having two contact arms 284 and 286. By positioning latitude speed switch 282 the proportion of time which the latitude relay 268 will be energized and the circuit closed at the points 268 will be varied, and therefore, latitude drive motor 238 may be made to run a varying proportion of the time. In addition to this means of varying the output of latitude drive motor 238 latitude variac 250 provides a second control means. Inasmuch as these two means are identical in operation with the means above described for varying the output of longitude drive motor 128 a detailed description of the instant case need not be presented.

*Means for simulating stars*

The simulated celestial sphere 95 which forms an important part of this invention is generally spherical in shape and has, as shown in Fig. 9, a frame comprising aluminum ribs 290 which preserve the desired shape of the sphere. Suitably attached to the inner set of these ribs is a wire mesh 292, and light sockets 294 representative of stars are mounted in some of the holes in the screen 292. These sockets are positioned upon the simulated celestial sphere so that they bear the same relative relation to one another and to the north celestial pole of the simulated celestial sphere as do the real stars which they represent bear to one another and to the real celestial north pole. In other words, one positioned at the navigator's post 41 within trainer fuselage 38 and looking at the celestial sphere will see the stars arranged as if he were viewing the real celestial sphere. In all, about 400 of these star simulating sockets are placed upon the inside of the simulated celestial sphere. Within each of the sockets 294 is a small bulb (not shown) which is energized by means of conductors 298 and around each of these bulbs is placed a cylinder (not shown) whose axis points toward the navigator's post 41 in the trainer, and over the end of the cylinder is placed suitable covering material having a very small aperture therein. By this arrangement, the navigator sees a relatively small source of light which to him looks like a star.

*Navigational stars*

In celestial navigation, although countless stars may be seen by the navigator, observations by the use of the sextant are made upon very few of them. Those stars upon which observations are made are all well-known and are fairly evenly distributed on the celestial sphere and are commonly referred to as the navigational stars. Those skilled in the art of celestial navigation will realize that the fundamental use of the sextant is to determine the altitude of the star under observation above the horizontal plane of the observing navigator. In practical navigation, the observed altitude must be accurate within a few minutes of arc in order that the navigator will be able to determine his position upon the earth within satisfactory navigational limits.

It will be readily understood that inasmuch as the diameter of the simulated celestial sphere must be limited to a few yards, a movement of the sextant of a relatively small distance within the simulated celestial sphere will make a relatively large difference in the observed altitude of any star upon the inside of the simulated celestial sphere, or expressing it in another manner a movement of one inch of the sextant within the simulated celestial sphere would change the observed altitude of the stars as much as a movement of several miles upon the earth's surface would change the observed altitude of the real stars. Therefore, there is incorporated in my invention the use of a plurality of collimators 300 such as are disclosed in United States Patent 2,310,031 dated Feb. 2, 1943, one of which is associated with each of the navigational stars within the simulated celestial sphere. Such an instrument has within its casing means for producing an apparent point source of light and employs a collimating objective lens which renders all rays passing therethrough parallel. There is, therefore, a projection of parallel rays emanating from the collimator having a cross sectional area equal to that of the collimating lens. When the observer's eye is within any part of the path of these parallel rays, he sees the apparent point source of light unmagnified. As soon as the observer's eye is removed from the path of the parallel rays, he does not see the source of light. Each of the collimators 300 is exactly positioned within the simulated celestial sphere so that the parallel rays emanating therefrom intercept at the navigator's post 41 in the trainer fuselage 38. The navigator in the fuselage 38, by placing his sextant within the area of parallel rays coming from any one of the collimated navigational stars can determine the altitude of the star above the horizontal within practical navigational limits because all of the parallel rays emanating from the apparent point source of light within the collimator make the same angle with any horizontal plane in which the sextant may be placed for an observation. If the sextant is placed outside the parallel rays, no observation may be taken. Therefore, for a given position of simulated celestial sphere 95 only one observed altitude of any given navigational star may be obtained. It is the function of the operator to position the simulated celestial sphere relative to the navigator's post 41 so that the navigator gets an observation equivalent to that which he would get if his actual position upon the earth's surface corresponded to that of the assumed position of the trainer.

It should be stated that the collimators 300 must be accurately positioned about the simulated celestial sphere so that they occupy the same position relative to one another that the stars which they represent occupy relative to one another in the real celestial sphere. With the dome 95 at the zenith of the rail 70, the collimators may be originally adjusted by any suitable means to the correct declination and LHAY. The non-navigational or uncollimated stars need not be so adjusted.

It will be readily understood that in the event that the atmosphere is hazy the lesser bright stars are the first to become invisible and, as the atmosphere gets heavier, more and more stars disappear from sight. When it is clear the stars appear much brighter than when atmospheric conditions are otherwise. In celestial navigation the stars are grouped into one of three classes: navigational, constellational, and miscellaneous.

As above explained, the navigational stars are those upon which the navigator takes observations with the aid of his sextant, such as Polaris. The constellational stars are those which are used by the navigator in order to locate the navigational stars, for example, it is well known that the two end stars of the Big Dipper, which is a constellation, point toward Polaris which is a navigational star. Some of the navigational stars are a part of the constellations. The miscellaneous stars are those which are of no particular significance to the navigator. The following means have been incorporated in this invention in order that the conditions which are actually encountered in navigation may be simulated with the use of my invention.

*Means for lighting miscellaneous stars*

Figure 10:
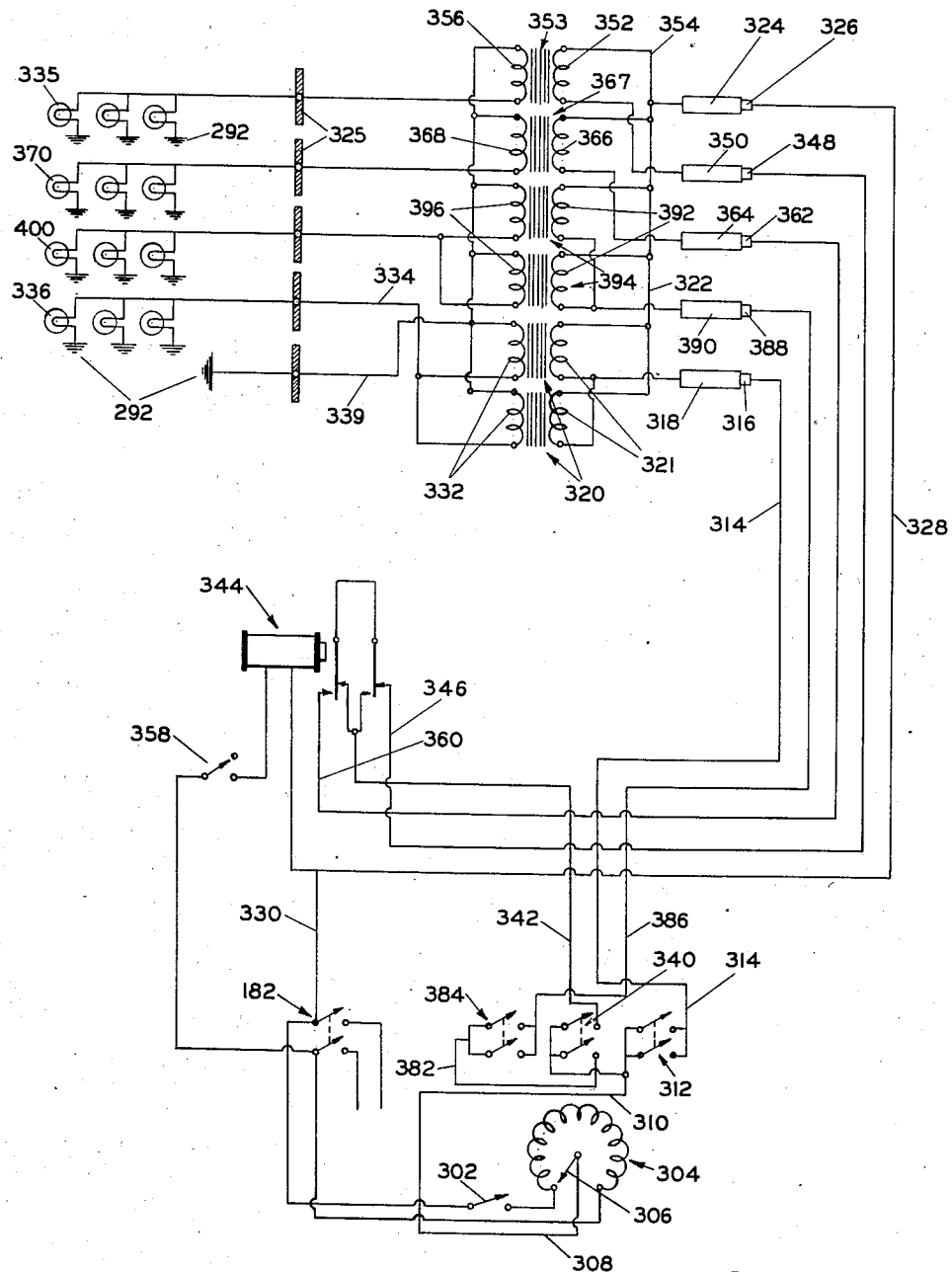
Fig. 10 is a diagrammatic view of the electrical system for controlling the illumination of the simulated stars inside the simulated celestial sphere.

Reference is made to Figs. 6 and 10 which show the means for lighting the desired simulated stars upon the inside of the celestial dome. It will be seen in Figs. 6 and 10 that whenever master switch 182 is in the "on" position and the stars switch 302 is also in the "on" position a voltage (ordinarily 110) is impressed across the terminals of the star density control variac 304. If the variable contact arm 306 of variac 304 be moved clockwise to some position along variac 304 a voltage will be impressed on conductor 308 and along conductor 310. If the miscellaneous stars switch 312 be closed current will be led along conductor 314 to brush 316 and to slip-ring 318 from whence it is carried to the transformers 320 which are arranged in parallel. Current flows through the primaries 321 and then by means of line 322 passes through slip-ring 324, brush 326, conductors 328, and 330, through master switch 182 back to the generator. The flow of current through the primary windings 321 of the transformers 320 induces a voltage in the secondary windings 332 which causes a current to flow through conductor 334 and bus bar 325 to the miscellaneous stars 336. All the bus bars are designated in Figs. 2, 3, 5 and 10 by 325. From these stars the current passes through the ground 292, which it will be recalled is the wire mesh, and then passes back to the other side of the secondary windings 332 of the transformers. It will therefore be realized that a closing of master switch 182, stars switch 302, a correct positioning of star density variac 304 and a closing of miscellaneous stars switch 312 will illuminate the miscellaneous stars of the simulated celestial sphere. It will be understood that the intensity of these miscellaneous stars may be regulated as desired by positioning star density control variac 304.

*Means for lighting navigational (collimated) stars*

A study of Fig. 10 further reveals that by closing master switch 182, stars switch 302, and by correctly positioning variac 304, current will flow along conductor 308 and if constellation switch 340, which is also shown in Fig. 6, be in the "on" position, current will pass along conductor 342. If collimator recognition relay 344 is not energized, as is the case in Fig. 10, current will pass through the relay and along conductor 346 to brush 348, slip-ring 350 and through the primary winding 352 of the transformer 353. From there current flows along conductor 354 and through the common return circuit which comprises slip-ring 324, brush 326 and conductor 328. A voltage will therefore be induced in the secondary winding 356 of the transformer and the apparent point sources of light 335 in the collimators 300 will be energized. It will be recalled that these lights in the collimators simulate the navigational stars. Current leaves the collimators by means of the common ground 292 which, as stated above, is the wire mesh, and is returned by means of conductor 329 to the other side of the transformer.

It will be seen from Fig. 10 that if the collimator recognition switch 358 be closed collimator recognition relay 344 will be energized and therefore current flowing from the constellation switch 340 through conductor 342 will not pass along conductor 346 to the collimators but instead will pass along conductor 360 to brush 362, slip-ring 364 and to the primary winding 366 of the transformer 367. A current will be induced in the secondary 368 of the transformer and the lights 370 which are known as the recognition lights will be energized. The switch 358 is located on the navigator's panel inside the trainer fuselage 38 and, therefore, the navigator has within his control whether the collimated stars 335 or the recognition stars in the interior of the celestial sphere shall be seen by him. Such means are important because, as previously explained, the rays emanating from the point source of light 335 within the collimators 300 are visible to the navigator only when his eye is in the path of the relatively small projection of rays coming from the collimators 300. In order that the navigator may easily locate the collimated navigational stars the switch 358 is provided. When this switch is in the "off" position collimator recognition relay 344 is not energized and the collimated stars 335 may be seen. However, when switch 358 is closed collimator recognition relay 344 is energized and the recognition lights 370 are energized. These lights, about to be disclosed in detail, are visible from any point within the simulated celestial sphere 95.

Reference is made to Fig. 11 which discloses a collimator 300 having a collimating objective lens 372 which, as previously explained, renders parallel all rays of light emanating from the interior thereof. Mounted upon the central portion of the collimating lens 372 is a polished glass reflector 374 having a convex side toward recognition star lamp 376. Within this lamp, which is identical with the star lamps 294 mounted in the wire mesh 292 is a bulb (not shown) energized by means of conductor 378. Light emanates from socket 376 through aperture 380 and is reflected by glass reflector 374 toward the observer's post in the trainer fuselage 38. The reflected rays will be visible from any point near the navigator's post, and, therefore, will enable him to locate the approximate position of the navigational stars. Having done this, by throwing switch 358 from the closed to the open position collimator recognition relay 344 loses its energization and, as previously explained, the collimated navigational stars 335 will become energized, while the recognition stars 370 will be shut off.

*Means for lighting constellations*

In the event that master switch 182 and stars switch 302 be closed and star density variac 304 be turned up, current will be led along conductor 308 and in the event constellation switch 340 be closed current will be carried along conductor 382 to switch 384 which is also seen in Fig. 6. If this last-mentioned switch be closed, current will be carried by conductor 386 to brush 388 and slip-ring 390 to the primary windings 392 of the transformers 394, and from these primaries to the common return 322. A voltage will therefore be induced in the secondary windings 396 which will cause the constellation lights 400 to be energized. The return circuit to the secondaries 396 is, as in the previously-explained instances, through the common ground 292.

The constellation lights 400 are energized whenever switch 384 is closed provided switch 340 also is closed because switch 340 is in series with switch 384. Switch 340 also controls the flow of current through conductor 342 and the collimator recognition relay, and, therefore, it will be realized that whenever the constellation lights 400 are energized by closing of switches 384 and 340, either the collimated lights 335 or the recognition lights 370 are also energized, depending upon the position of the collimator recognition switch 358 upon the navigator's panel in the trainer fuselage 38.

From the foregoing description it will be realized that the operator, by means of the miscellaneous stars switch 312 may illuminate the miscellaneous stars of the simulated celestial sphere as desired; and by means of switch 340 the operator may make it possible for the navigator to illuminate either the collimated navigational stars or the recognition stars; and the navigator may, by means of switches 384 and 340, illuminate the constellation stars.

*Indicators*

Inasmuch as it is an object of this invention to provide means whereby the simulated celestial sphere may be made to change its position relative to the fuselage according to the passage of time, a change in the longitudinal position of the observer as well as a change in the latitude position of the observer, it will be realized that the operator must have within his sight instruments which will tell him at all times the assumed time, the position of the simulated celestial sphere as well as the assumed position of the trainer upon the earth's surface.

An important concept in the field of celestial navigation is the Local Hour Angle of Aries, abbreviated LHAY. Aries is a point upon the celestial sphere, and inasmuch as the celestial sphere may be considered stationary, Aries is a fixed point. Inasmuch as the earth rotates upon its axis it will be realized that the point on the earth directly adjacent Aries is constantly changing. The difference in longitude between any point upon the earth's surface and the longitude of the point upon the earth directly beneath Aries is known as the Local Hour Angle of Aries. Inasmuch as the earth is constantly rotating on its axis within the celestial sphere it will be realized that the LHAY of any given point upon the earth's surface is constantly varying and inasmuch as the celestial sphere makes an apparent rotation of 360° 59' about any given point upon the earth in 24 hours, it will be realized that the LHAY of any given point will vary through an equal number of degrees in that length of time or that it will vary through 360° in slightly less than 24 hours. Thus, if an observer be stationed at a given point upon the earth's surface his LHAY will vary with the rotation of the earth but if the observer be traveling upon the surface of the earth the change in his LHAY will be the result of that which is caused by the rotation of the earth as modified by his movement upon the earth. If the observer be traveling in the same direction as the rotation of the earth his rate of change in LHAY will be accelerated while if he alters his longitudinal position in a direction opposite that of the rotation of the earth his rate of change in LHAY will be decreased. It is therefore evident that the LHAY of an observer depends upon two factors: time and longitudinal position upon the surface of the earth.

It is apparent that if the operator is to maintain the simulated celestial sphere in a position relative to the navigator's post 41 in the trainer fuselage 38, such that the navigator sees the stars of the simulated sphere as he would see the stars of the real celestial sphere were he at a given place upon the earth's surface at a given time, he must know the assumed time as well as the assumed longitudinal and latitudinal position of the trainer.

Reference is made to Fig. 5 which shows the central hub 170 which, it will be recalled, is mounted upon central shaft 145 for rotation therewith. An annular gear 402 is integral with the upper portion of this central hub and mounted in workable relation to this annular gear is pinion 404 which is rigidly mounted upon vertical shaft 406, to the other end of which is rigidly affixed another gear 408. Pinion 410, which in turn is in workable relation with gear 408, is integral with shaft 412 which is the input shaft of the LHAY transmitter 414. This transmitter is connected to a receiver 416 of similar type by means of cable 418 so that the central shaft (not shown) of the receiver 416 moves through the same angle as does the input shaft 412 of transmitter 414. The central shaft of the receiver 416 is geared to the hands 420 which move across the dial of indicator 422 in such a manner that as the simulated celestial sphere and annular gear 402 rotate through a given number of degrees the hands and dial of indicator 422 indicate the number of degrees of movement. LHAY indicator 422 is shown upon the instrument panel 465 of the operator's desk 458 in Fig. 12.

Figure 12:
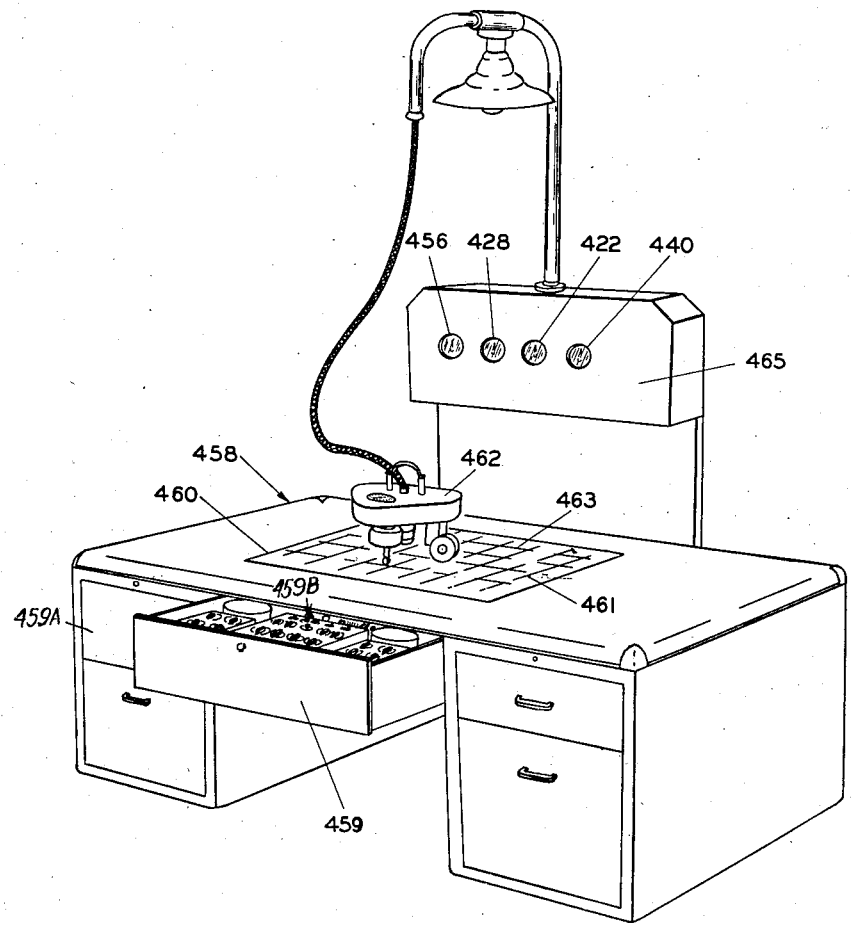
Fig. 12 is a detailed view of the operator's desk.

Also shown in Fig. 5 is the longitude transmitter 142 to which reference has been previously made. This transmitter is connected to the central shaft of receiver 424 in the same manner that the LHAY transmitter 414 is connected with the central shaft of receiver 416 and, therefore, the central shaft of receiver 424 is geared to hands 426 in such a manner that these hands move across the dial of indicator 428 to show the number of degrees that the simulated celestial sphere and annular gear 402 rotate as a result of the running of longitude drive motor 128. Longitude indicator 428 is also shown in Fig. 12.

It will be recalled that time drive motor 94 drives shaft 98 at the rate of two revolutions per minute and that gears 100, 102, 106 and 108 step up the rotation of shaft 98 slightly because of the difference in the length of a sidereal and solar day. Gear 114 will therefore make slightly more than two revolutions per minute and, as seen in Fig. 5, this gear is in working relation with another gear 430 which is rigidly mounted upon the input shaft 432 of time transmitter 434 which is of the same type as transmitters 142 and 414. This transmitter is connected to a receiver 436 in the same manner that transmitters 142 and 414 are connected to, their respective receivers and, therefore, the central shaft of the receiver 436 rotates at the same rate as shaft 432. By employing a gear train designated generally as 439 having gears similar to gears 100, 102, 106 and 108 it is possible to reduce the effect of the rotation of the central shaft of the receiver 436 to the same speed of rotation as shaft 98. Having thus reduced the speed of rotation of shaft 441 in this manner, clock hands 438 may easily be made to give the elapse of solar (civil) time. Clock 440 therefore indicates the exact amount of time that time motor 94 runs. This clock is also shown in Fig. 12.

One of these clocks 440 is provided for the operator, and inasmuch as the element of time must also be known by the navigator, a similar clock is provided for the navigator in the trainer fuselage 38. Consequently, the operator and the navigator both have synchronized time indicators.

Also seen in Fig. 5 is a section of dome rail 70. Along one side of the top of this rail is a series of holes 443. Latitude transmitter 442 which is of the same type as transmitters 142, 414 and 434 has an input shaft 444 upon the end of which is mounted roller 446. This roller has a plurality of upraised portions 448 evenly spaced around the roller and the holes 443 in the dome rail 70 are spaced so that the upraised portions 448 of the roller fall therein as the latitude teletorque transmitter 442 is moved up or down the dome rail as a result of a movement of the dome gear box 74. It will be seen in Fig. 3 that the latitude teletorque transmitter 442 is mounted upon the dome gear box and therefore the roller 446 and input shaft 444 will rotate as the dome gear box 74 and simulated celestial sphere move along the dome rail. Transmitter 442 is connected by means of cable 450 with a teletorque receiver 452 which has connected to its central shaft hands 454 which move across the dial of indicator 456. The central shaft of the receiver 452, hands 454 and the dial of indicator 456 are arranged so that as the dome gear box 74 and simulated celestial sphere 95 move along the dome rail 70 the indicator 456 will show the number of degrees of latitude that an observer would have to move through in order that the stars of the real celestial sphere would change their positions relative to him in the same manner that the stars of the simulated celestial sphere have changed their positions relative to the navigator's post 41. Latitude indicator 456 is shown on the instrument panel 465 in Fig. 12.

Reference is now made to Fig. 12 which shows a detailed view of the operator's desk designated generally in Fig. 1 as 458. Placed thereupon is a map 460 having suitable lines of longitude 461 and latitude 463 and positioned upon the map is a recorder 462 of the type fully disclosed in U. S. Patent 2,179,663. Recorder 462 is electrically connected as therein disclosed to the trainer fuselage 38 in such a manner that the direction of travel of the recorder 462 over the map 460 is at all times in the same direction as the heading of trainer fuselage 38, and the speed of recorder 462 is proportional to the assumed speed of the trainer 38. It will therefore be realized that recorder 462 traces upon map 460 a record of the assumed flight of the trainer 38. The LHAY indicator 422, longitude indicator 428, latitude indicator 456 and time indicator 440 are shown in their positions upon the operator's desk.

*Operation*

The above-mentioned copending application Serial Number 250,958 discloses a simulated celestial sphere similar to the sphere of this application, a dome rail, means for moving the celestial sphere along the dome rail, and means for rotating the celestial sphere. A trainer of the type disclosed in the United States Patents 1,825,462 and 2,099,857 is also disclosed in that application. The recorder, collimators, stars, and some of the other controls and indicators disclosed in this application are also disclosed in applicant's copending application.

In order that the operation and utility of the previously disclosed mechanism may be more fully appreciated, let us assume that a "problem" is to be "run." It is assumed that the trainer is at 95° longitude 45° latitude on November 10, at 10:30 p. m. Greenwich Civil Time, or in the language of celestial navigators, 22:30:00 o'clock Greenwich Civil Time. It will be readily understood that simulated celestial sphere 95 must be placed in the same position relative to the navigator's post 41 in the trainer fuselage 38 that the celestial sphere bears to the point longitude 95° latitude 45° at 10:30 p. m. November 10, 1942. It is therefore necessary to determine the LHAY of the point 95° longitude 45° latitude at 22:30:00 Greenwich Civil Time November 10, 1942, and, let us assume that the navigational tables show that the required LHAY is 175°.

The simulated celestial sphere must therefore be placed in relation to the trainer fuselage 38 so that the simulated stars then have the same position relative to the navigator's post 41 within the fuselage 38 that the stars of the real celestial sphere have to an observer whose LHAY is 175°.

In order that this important relationship may be secured by means of a suitable release (not shown) associated with latitude drive motor 238, cable 234 is released and dome counterweight sector 232 pulls dome gear box 74 and the simulated celestial sphere 95 up dome rail 70 until the axis of dome gear box 74 and the simulated celestial north pole of the simulated celestial sphere are exactly above the navigator's post 41 in fuselage 38. Line 39 in Fig. 1, it will be recalled, runs from the uppermost point of dome rail 70 through the center of the navigator's post in the fuselage 38 and therefore this line will coincide with the axis of dome gear box 74 and with the simulated north celestial pole when the simulated celestial sphere is positioned exactly above the navigator's post within the trainer fuselage 38. A suitable stop (not shown) may be provided along dome rail 70 to stop dome gear box 74 and simulated celestial sphere 95 at the zenith of the dome rail 70. When the simulated celestial sphere is so stopped it bears to the observer's post within the trainer fuselage 38 the same relation that the real celestial sphere bears to an observer at the North Pole. The latitude indicator 456 is therefore set at 90°.

Although when thus positioned the simulated celestial sphere shows the stars as they would appear at 90° latitude it will be understood that if an observer were standing at the North Pole the northern half of the real celestial sphere would appear to rotate around him. Therefore, in order to simulate the appearance of the stars at any given instant of time and at a certain longitudinal point the simulated celestial sphere must be given the correct rotational position.

Referring to Fig. 1, it will be seen that a projector 464 is mounted upon the simulated celestial sphere 95 in such a manner as to project a small beam of light outwardly of the simulated celestial sphere. This light is mounted on the simulated celestial sphere at the same longitude as Aries, that is, if an arc were drawn from the simulated north celestial pole through the light 464 Aries would lie along the arc. It will be recalled that all of the simulated stars within the simulated celestial sphere are positioned relative to Aries and to one another exactly as the real stars are positioned relative to the real Aries and to one another. A small target 466 is mounted upon the side of the building exactly under dome rail 70 and if the simulated celestial sphere is rotated until the light from projector 464 shines upon target 466 Aries will be at some point exactly beneath dome rail 70. Inasmuch as the dome gear box 74 and simulated celestial sphere are positioned at the zenith of dome rail 70 (as though the trainer were at 90° latitude) and simulated celestial sphere is in such a position that the light from projector 464 strikes target 466, if dome gear box 74 and simulated celestial sphere be drawn down dome rail 70 through the action of latitude drive motor 238 until latitude indicator 456 reads 45° no rotation of simulated celestial sphere taking place, it will be realized that the simulated celestial sphere has changed its position relative to the observer's post in the same manner that the real celestial sphere would change its position relative to an observer who was at the North Pole and who instantaneously changed his latitudinal position 45° upon the surface of the earth, his longitudinal position being exactly opposite that of Aries and therefore his LHAY being 180°. The LHAY indicator 422 is therefore set to 180°.

Inasmuch as the LHAY of the point 95° longitude 45° latitude at 22:30:00 o'clock Greenwich Civil Time November 10, 1942, is 175° it is necessary to rotate the simulated celestial sphere through 5° in the correct direction in order that the LHAY indicator 422 reads 175°. When this is done we know that the simulated celestial sphere 95 bears to the navigator's post 41 the same relative position that the real celestial sphere bears to an observer having a latitudinal position of 45° and a LHAY of 175°. An observer's LHAY could be 175° for any longitude providing that the correct time be selected but in this particular instance the observer's longitude is 95° and the time is 22:30:00 Greenwich Civil Time on November 10. Longitude indicator 428 is therefore set to 95° and the time indicator 440 is set at 22:30:00.

The recorder 462 is then set upon map 460 at the point 90° longitude 45° latitude.

The operator places the star control switches shown in Figs. 6 and 10 in the desired positions to illuminate the stars within the simulated celestial sphere as desired. The control panel shown in Fig. 6 is located in drawer 459A in the operator's desk in Fig. 12. Master switch 182 of course must be closed in order that the stars may be illuminated.

The operator of course knows the plan of the assumed flight to be made by the crew within the trainer fuselage and therefore he knows whether the trainer will fly east, west, north or south and he places switches 176 and 246 accordingly. The approximate rate of change of longitude will also be known by the operator and he will position longitude variac 178 and longitude speed control 180 accordingly. Knowing what the approximate rate of latitude change will be latitude variac 250 and latitude speed control 282 are also positioned correctly by the operator.

By means of an interphone communication system (not shown) between the operator's desk 458 and the trainer fuselage 38 both crew and operator know the instant of the beginning of the assumed flight and at that time the operator throws navigation switch 184 to the closed position. (The operator's interphone communication system controls are designated generally in Fig. 12 by 459B and are contained in drawer 459). The pilot in the trainer at that instant takes off, and the recorder starts to run. Time motor 94 at that instant begins to run and as a result of the action of this motor main drive gear 126 and the simulated celestial sphere 95 will rotate at the same rate that the celestial sphere apparently rotates about the earth.

The running of time drive motor 94 also will cause clock 440 to show the passing of the time of the assumed flight.

Longitude drive motor 128 will also be started by the throwing of the navigation switch 184 and its running will speed up the rotation of main drive gear 126 and the simulated celestial sphere 95 if the assumed direction of travel be east, while if the assumed direction of travel be west the rotation of the celestial sphere caused by the running of time drive motor 94 will be decreased.

The running of longitude drive motor 128 also causes longitude indicator 428 to change its indication according to the direction and amount of the output of this motor. As explained above, the direction and amount of the output of longitude drive motor 128 is controlled by the operator according to the actual change in longitude in the assumed position of the trainer and therefore longitude indicator 428 at all times indicates the assumed longitudinal position of the trainer. The operator, by observing the position of the recorder 462 upon map 460, controls the speed of longitude drive motor 128 so that the longitudinal position of the recorder 462 upon the map 460 is the same as the indicated longitude of longitude indicator 428. The operator then knows that he has moved the celestial sphere 95 the correct amount to simulate the change in the apparent movement of the real celestial sphere that would result from an actual longitudinal change upon the earth's surface equal to that represented by the recorder's travel.

The closing of navigation switch 184 also causes latitude drive motor 238 to run at a speed determined by the positioning of latitude variac 250 and latitude speed control 282. As latitude drive motor 238 pulls dome gear box 74 and simulated celestial sphere 95 down dome rail 70 or allows counterweight 232 to draw dome gear box 74 and simulated celestial sphere 95 up dome rail 70, the movement of latitude transmitter 442 and the turning of its central shaft caused by roller 446 will cause latitude indicator 456 to indicate the correct latitude. The operator, by observing the latitudinal position of recorder 462 upon map 460 is therefore able to regulate the speed of latitude drive motor 238 in order that the indicator 456 gives the correct latitude as represented by the position of the recorder upon the map. The operator therefore knows that the simulated celestial sphere bears to the trainer the same relative position that the real celestial sphere would bear to an observer stationed upon the surface of the earth at that latitude.

As soon as the "flight" is started it is the job of the navigator in the trainer fuselage 38 to direct the course of "flight" of the trainer by making observations, with the use of his sextant, upon the previously described simulated navigational stars, in the same manner that the navigator in a real plane directs the flight of the plane by making observations upon the real celestial bodies.

From the foregoing description it will be seen that with the use of the apparatus which forms the subject of this invention the conditions encountered in celestial navigation may be exactly simulated, and therefore, the navigator may be put to the same tasks as though he were in actual flight.

The foregoing being the preferred embodiment of my invention, I do not limit myself except by the following claims construed in view of the prior art.

I claim:

1. A device for teaching celestial navigation comprising means simulating a portion of the celestial sphere; a supporting means for a student, said supporting means comprising means for simulating certain movements of a vehicle in motion including means for rotating said supporting means about its vertical axis in simulation of the turning of a vehicle; a navigator's post within said supporting means, said supporting means and said sphere simulating means being relatively positioned whereby the interior of said sphere simulating means may be viewed from said navigator's post, the axis of rotation of said supporting means being through said navigator's post.

2. A device for teaching celestial navigation comprising a dome-like structure in simulation of a portion of the celestial sphere; a supporting means for a student, said supporting means comprising means for simulating certain movements of a vehicle in motion including means for rotating said supporting means about its vertical axis in simulation of the turning of a vehicle; a navigator's post within said supporting means, said supporting means and said dome being relatively positioned whereby the interior of said dome is visible from said navigator's post, the axis of rotation of said supporting means being through said navigator's post.

3. A device for teaching celestial navigation comprising means simulating a portion of the celestial sphere; a supporting means for a student, said supporting means comprising means for simulating certain movements of a vehicle in motion including means for rotating said supporting means about its vertical axis in simulation of the turning of a vehicle; a navigator's post within said supporting means, said supporting means and said sphere simulating means being relatively positioned whereby the interior of said sphere simulating means may be viewed from said navigator's post, the axis of rotation of said supporting means being through said navigator's post; and means for rotating said sphere simulating means about said navigator's post in simulation of the apparent rotation of the celestial sphere about the earth caused by the rotation of the earth upon its axis.

4. A device for teaching celestial navigation comprising a dome-like structure in simulation of a portion of the celestial sphere; a supporting means for a student, said supporting means comprising means for simulating certain movements of a vehicle in motion including means for rotating said supporting means about its vertical axis in simulation of the turning of a vehicle; a navigator's post within said supporting means, said supporting means and said dome being relatively positioned whereby the interior of said dome may be viewed from said navigator's post, the axis of rotation of said supporting means being through said navigator's post; and means for rotating said dome-like portion about said navigator's post in simulation of the apparent rotation of the celestial sphere about the earth caused by the rotation of the earth upon its axis.

5. A device for teaching celestial navigation comprising means simulating a portion of the celestial sphere; means for rotating said sphere simulating means about an axis in simulation of the apparent rotation of the real celestial sphere about the earth caused by the rotation of the earth upon its axis; and means for modifying said first-mentioned rotation of said sphere simulating means in accordance with an assumed change in the longitudinal position of an observer, in simulation of the modification of the apparent rotation of the real celestial sphere about the earth due to the turning of the earth upon its axis caused by a change in an observer's longitudinal position upon the earth.

6. A device for teaching celestial navigation comprising a dome-like structure in simulation of a portion of the celestial sphere; means for rotating said dome about an axis in simulation of the apparent rotation of the real celestial sphere about the earth caused by the rotation of the earth upon its axis; and means for modifying said first-mentioned rotation of said dome in accordance with an assumed change in the longitudinal position of an observer, in simulation of the modification of the apparent rotation of the real celestial sphere about the earth due to the turning of the earth upon its axis caused by a change in an observer's longitudinal position upon the earth.

7. A device for teaching celestial navigation comprising means for simulating a portion of the celestial sphere; means for rotating said sphere simulating means about an axis in simulation of the apparent rotation of the real celestial sphere about the earth caused by a rotation of the earth upon its axis; and means for rotating said sphere simulating means about an axis at right angles to said first-mentioned axis in simulation of the apparent rotation of the real celestial sphere about the earth caused by a change in the latitudinal position of an observer upon the earth.

8. A device for teaching celestial navigation comprising a dome-like structure in simulation of a portion of the celestial sphere; means for rotating said dome about an axis in simulation of the apparent rotation of the real celestial sphere about the earth caused by a rotation of the earth upon its axis; and means for rotating said dome about an axis at right angles to said first-mentioned axis in simulation of the apparent rotation of the real celestial sphere about the earth caused by a change in the latitudinal position of an observer upon the earth.

9. A device for teaching celestial navigation comprising means simulating a portion of the celestial sphere; means for rotating said sphere simulating means about an axis in simulation of the apparent rotation of the real celestial sphere about the earth caused by the rotation of the earth upon its axis; means for modifying said first-mentioned rotation of said sphere simulating means in accordance with an assumed change in the longitudinal position of an observer, in simulation of the modification of the apparent rotation of the real celestial sphere about the earth due to the turning of the earth upon its axis caused by a change in an observer's longitudinal position upon the earth; and means for rotating said sphere simulating means about an axis at right angles to said first-mentioned axis in simulation of the apparent rotation of the real celestial sphere about the earth caused by a change in the latitudinal position of an observer upon the earth.

10. A device for teaching celestial navigation comprising a dome-like structure in simulation of a portion of the celestial sphere; means for rotating said dome about an axis in simulation of the apparent rotation of the real celestial sphere about the earth caused by the rotation of the earth upon its axis; means for modifying said first-mentioned rotation of said dome in accordance with an assumed change in the longitudinal position of an observer, in simulation of the modification of the apparent rotation of the real celestial sphere about the earth due to the turning of the earth upon its axis caused by a change in an observer's longitudinal position upon the earth; and means for rotating said dome about an axis at right angles to said first-mentioned axis in simulation of the apparent rotation of the real celestial sphere about the earth caused by a change in the latitudinal position of an observer upon the earth.

11. A device for teaching celestial navigation comprising means simulating a portion of the celestial sphere; a supporting means for a student, said supporting means comprising means for simulating certain movements of a vehicle in motion, said supporting means and said sphere simulating means being relatively positioned whereby a student in said supporting means may view the interior of said sphere simulating means; means for rotating said sphere simulating means about an axis in simulation of the apparent rotation of the real celestial sphere about the earth caused by the rotation of the earth upon its axis; and means for modifying said first-mentioned rotation of said sphere simulating means in accordance with an assumed change in the longitudinal position of an observer, in simulation of the modification of the apparent rotation of the real celestial sphere about the earth due to the turning of the earth upon its axis caused by a change in an observer's longitudinal position upon the earth.

12. A device for teaching celestial navigation comprising means simulating a portion of the celestial sphere; a supporting means for a student, said supporting means comprising means for simulating certain movements of a vehicle in motion, said supporting means and said sphere simulating means being relatively positioned whereby a student in said supporting means may view the interior of said sphere simulating means; means for rotating said sphere simulating means about said supporting means in simulation of the apparent rotation of the reel celestial sphere about the earth caused by a rotation of the earth upon its axis; and means for rotating said sphere simulating means about an axis at right angles to the axis of said first-mentioned rotation in simulation of the apparent rotation of the real celestial sphere about the earth caused by a change in an observer's latitudinal position upon the earth.

13. A device for teaching celestial navigation comprising means simulating a portion of the celestial sphere; a supporting means for a student, said supporting means comprising means for simulating certain movements of a vehicle in motion, said supporting means and said sphere simulating means being relatively positioned whereby a student in said trainer may view the interior of said sphere simulating means; means for rotating said sphere simulating means about said supporting means in simulation of the appararent rotation of the real celestial sphere about the earth caused by a rotation of the earth upon its axis; and means for modifying said first-mentioned rotation of said sphere simulating means in accordance with an assumed change in the longitudinal position of the observer, in simulation of the modification of the apparent rotation of the real celestial sphere about the earth due to the turning of the earth upon its axis caused by a change in an observer's longitudinal position upon the earth.

14. A device for teaching celestial navigation comprising means simulating a portion of the celestial sphere; a supporting means for a student, said supporting means comprising means for simulating certain movements of a vehicle in motion including means for rotating said supporting means about its vertical axis in simulation of the turning of a vehicle; a navigator's post within said supporting means, the axis of rotation of said supporting means being through said navigator's post, said supporting means and said sphere simulating means being relatively positioned whereby a student in said navigator's post may view the interior of said sphere simulating means; means for rotating said sphere simulating means about said navigator's post in simulation of the apparent rotation of the real celestial sphere about the earth caused by the rotation of the earth upon its axis; and means for modifying said first-mentioned rotation of said sphere simulating means in accordance with an assumed change in the longitudinal position of the observer, in simulation of the modification of the apparent rotation of the real celestial sphere about the earth due to the turning of the earth upon its axis caused by a change in the observer's longtiudinal position on the earth.

15. A device for teaching celestial navigation comprising a dome-like structure in simulation of a portion of the celestial sphere; a supporting means for a student, said supporting means comprising means for simulating movements of a vehicle in motion including means for rotating said supporting means about its vertical axis in simulation of the turning of a vehicle; a navigator's post within said supporting means, the axis of rotation of said supporting means being through said navigator's post, said supporting means and said dome being relatively positioned whereby a student in said navigator's post may view the interior of said dome; means for rotating said dome about said navigator's post in simulation of the apparent rotation of the real celestial sphere about the earth caused by the rotation of the earth upon its axis; and means for modifying said first-mentioned rotation of said dome in accordance with an assumed change in the longitudinal position of the observer, in simulation of the modification of the apparent rotation of the real celestial sphere about the earth due to the turning of the earth upon its axis caused by a change in an observer's longitudinal position on the earth.

16. A device for teaching celestial navigation comprising means for simulating a portion of the celestial sphere; a supporting means for a student, said supporting means comprising means for simulating certain movements of a vehicle in motion including means for rotating said supporting means about its vertical axis in simulation of the turning of a vehicle; a navigator's post within said supporting means, the axis of rotation of said supporting means being through said navigator's post, said supporting means and said sphere simulating means being relatively positioned whereby a student in said navigator's post may view the interior of said sphere simulating means; means for rotating said sphere simulating means about said navigator's post in simulation of the apparent rotation of the real celestial sphere about the earth caused by a rotation of the earth upon its axis; and means for rotating said sphere simulating means about said navigator's post in simulation of the apparent rotation of the real celestial sphere about the earth caused by a change in the latitudinal position of an observer upon the earth.

17. A device for teaching celestial navigation comprising means simulating a portion of the celestial sphere; a supporting means for a student, said supporting means comprising means for simulating certain movements of a vehicle in motion including means for rotating said supporting means about its vertical axis in simulation of the turning of a vehicle; a navigator's post within said supporting means, the axis of rotation of said supporting means being through said navigator's post, said supporting means and said sphere simulating means being relatively positioned whereby the interior of said sphere simulating means may be viewed from said navigator's post; means for rotating said sphere simulating means about said navigator's post in simulation of the apparent rotation of the real celestial sphere about the earth caused by a rotation of the earth upon its axis; and means for modifying said first-mentioned rotation of said sphere simulating means in accordance with an assumed change in the longitudinal position of an observer, in simulation of the modification of the apparent rotation of the real celestial sphere about the earth due to the turning of the earth upon its axis caused by a change in an observer's longitudinal position upon the earth.

18. In a device for teaching celestial navigation the combination of a supporting means for a student navigator, means for moving said supporting means in simulation of a plane in actual flight, and means simulating a portion of the celestial sphere positioned above and movable about said supporting means, said sphere simulating means being provided with means visible from said support in simulation of the celestial bodies, whereby said student navigator may make angle measuring observations upon said visible means under simulated flying conditions to determine an assumed geographical position upon the earth's surface.

19. In a device for teaching celestial navigation the combination of a supporting means for a student navigator, means for moving said supporting means in simulation of a plane in actual flight, means simulating a portion of the celestial sphere positioned above and movable about said supporting means, said sphere simulating means comprising means visible from said support in simulation of the celestial bodies, whereby said student navigator may take angle measuring observations upon said visible means under simulated flying conditions to determine a simulated geographical position above the earth's surface, and means for rotating said sphere simulating means to simulate an assumed change in the longitudinal position of said supporting means.

20. In a device for teaching celestial navigation the combination of a supporting means for a student navigator, means for moving said supporting means in simulation of a plane in actual flight, means simulating a portion of the celestial sphere positioned above and movable about said supporting means, said sphere simulating means comprising means visible from said support simulating the celestial bodies, whereby said student navigator may take angle measuring observations under simulated flying conditions to determine an assumed geographical position above the earth's surface, and means for varying the position of said sphere simulating means with respect to said supporting means in simulation of the varying of the position of the real celestial sphere relative to an observer as a result of a change in the latitudinal position of the observer upon the earth.

21. In a device for teaching celestial navigation the combination of means simulating a portion of the celestial sphere, said simulating means comprising a plurality of sources of light positioned about said sphere simulating means and visible from therewithin, and means for limiting the observation area within said sphere simulating means in which a student navigator may place an instrument while taking an observation upon certain of said sources of light.

22. In a device for teaching celestial navigation the combination of a dome-like structure in simulation of a portion of the celestial sphere, a plurality of sources of light positioned about the interior of said dome and visible from beneath said dome, and means for limiting the observation area beneath said dome in which a student navigator may place an instrument while taking an observation upon certain of said sources of light.

23. In a device for teaching celestial navigation the combination of means simulating a portion of the celestial sphere, said simulating means comprising a plurality of sources of light positioned about said sphere simulating means and visible from therewithin, and means associated with certain of said sources of light to render said certain sources of light invisible except within a restricted area.

24. In a device for teaching celestial navigation the combination of means simulating a portion of the celestial sphere, said simulating means comprising a plurality of sources of light positioned about said sphere simulating means and visible from within said sphere simulating means and means associated with certain of said sources of light to render all of the rays emanating from each of said certain sources parallel.

25. In a device for teaching celestial navigation the combination of a dome-like structure, a plurality of sources of light positioned about the interior of said dome in simulation of a portion of the celestial sphere, and means associated with certain of said sources of light to render all of the rays emanating from each of said certain sources parallel.

26. In a device for teaching celestial navigation the combination of means simulating a portion of the celestial sphere, said simulating means comprising a plurality of sources of light positioned about said sphere simulating means and visible from therewithin, certain of said sources of light comprising a plurality of collimators in order to render all of the rays emanating from each of said certain sources parallel.

27. In a device for teaching celestial navigation the combination of means simulating a portion of the celestial sphere, said simulating means comprising a source of light simulating a celestial body visible from within said sphere simulating means, and means for limiting the observation area within said sphere simulating means in which a student navigator may place a sextant while taking an observation upon said simulated body.

28. In a device for teaching celestial navigation the combination of means simulating a portion of the celestial sphere, said simulating means comprising at least one source of light visible from within said sphere simulating means, at least one of said sources of light comprising a collimator in order to render all of the rays emanating from said source parallel.

29. In a device for teaching celestial navigation the combination of a dome-like structure, a plurality of sources of light positioned about the interior of said dome in simulation of a portion of the celestial sphere, certain of said sources of light comprising a plurality of collimators in order to render all of the rays emanating from each of said certain sources parallel.

30. In a device for teaching celestial navigation the combination of means simulating a portion of the celestial sphere, said simulating means comprising a plurality of sources of light positioned about said sphere simulating means and visible from therewithin, means for limiting the observation area within said sphere simulating means in which a student navigator may place an instrument while taking an observation upon certain of said sources of light, and means for rotating said sphere simulating means about said limited area in simulation of the apparent rotation of the real celestial sphere about the earth caused by the rotation of the earth upon its axis.

31. A device for teaching celestial navigation comprising means simulating a portion of the celestial sphere, said simulating means comprising a plurality of sources of light positioned about said sphere simulating means and visible from therewithin, means associated with certain of said sources of light to render all of the rays emanating from each of said certain sources parallel, and means for rotating said sphere simulating means in simulation of the apparent rotation of the real celestial sphere about the earth caused by the rotation of the earth upon its axis.

32. A device for teaching celestial navigation comprising means simulating a portion of the celestial sphere, said simulating means comprising a plurality of sources of light positioned about said sphere simulating means and visible from therewithin, certain of said sources of light comprising collimators whereby all of the rays emanating from each of said certain sources are rendered parallel, and means for rotating said sphere simulating means in simulation of the apparent rotation of the real celestial sphere about the earth caused by the rotation of the earth upon its axis.

33. A device for teaching celestial navigation comprising means simulating a portion of the celestial sphere, said simulating means comprising a plurality of sources of light positioned about said sphere simulating means and visible from within said sphere simulating means, means associated with certain of said sources of light to render said certain sources of light invisible except within a restricted area, and means for rotating said sphere simulating means about said restricted area in simulation of the apparent rotation of the real celestial sphere about the earth caused by the rotation of the earth upon its axis.

34. In a device for teaching celestial navigation the combination of means simulating a portion of the celestial sphere, said simulating means comprising a plurality of sources of light positioned about said sphere simulating means and visible from therewithin; means for limiting the area within said sphere simulating means in which a student navigator may place an angle measuring instrument while taking an observation upon certain of said sources of light; means for rotating said sphere simulating means about said limited area in simulation of the apparent rotation of the real celestial sphere about the earth caused by a rotation of the earth upon its axis; and means for rotating said sphere simulating means about said limited area and about an axis at right angles to the axis of said first-mentioned rotation in simulation of the apparent rotation of the real celestial sphere about the earth caused by a change in the latitudinal position of an observer upon the earth.

35. A device for teaching celestial navigation comprising means for simulating a portion of the celestial sphere, said simulating means comprising a plurality of sources of light positioned about said sphere simulating means and visible from therewithin; means associated with certain of said sources of light to render all of the rays emanating from each of said certain sources parallel; means for rotating said sphere simulating means in simulation of the apparent rotation of the real celestial sphere about the earth caused by a rotation of the earth upon its axis; and means for rotating said sphere simulating means about an axis at right angles to the axis of said first-mentioned rotation, in simulation of the apparent rotation of the real celestial sphere about the earth caused by a change in the latitudinal position of an observer upon the earth.

36. A device for teaching celestial navigation comprising means for simulating a portion of the celestial sphere, said simulating means comprising a plurality of sources of light positioned about said sphere simulating means and visible from therewithin; certain of said sources of light each comprising a collimator whereby the rays emanating from each of said certain sources are rendered parallel; means for rotating said sphere simulating means in simulation of the apparent rotation of the real celestial sphere about the earth caused by a rotation of the earth upon its axis; and means for rotating said sphere simulating means about an axis at right angles to the axis of said first-mentioned rotation, in simulation of the apparent rotation of the real celestial sphere about the earth caused by a change in the latitudinal position of an observer upon the earth.

37. A device for teaching celestial navigation comprising the combination of means simulating a portion of the celestial sphere, a supporting means for a student, said supporting means comprising means for simulating certain movements of a vehicle in motion, said sphere simulating means comprising a plurality of sources of light positioned about said sphere simulating means and visible from said supporting means, and means associated with certain of said sources of light to render said certain sources invisible except from said supporting means.

38. A device for teaching celestial navigation comprising the combination of means simulating a portion of the celestial sphere, an aviation trainer comprising means for simulating certain movements of a plane in actual flight, said sphere simulating means comprising a plurality of sources of light positioned about said sphere simulating means and visible from said trainer, and means associated with certain of said sources of light to render the rays emanating from each of said certain sources parallel and visible from said trainer.

39. A device for teaching celestial navigation comprising the combination of means simulating a portion of the celestial sphere, an aviation trainer comprising means for simulating certain movements of a plane in actual flight, said sphere simulating means comprising a plurality of sources of light positioned about said sphere simulating means and visible from said trainer, and a plurality of collimators associated with certain of said sources of light to render the rays emanating from each of said certain sources parallel and visible from said trainer.

40. In a device for teaching celestial navigation the combination of means simulating a portion of the celestial sphere, means comprising a synchronous motor for rotating said sphere simulating means at a rate proportional to the rate of apparent rotation of the celestial sphere about the earth occurring with an elapse of time, means for starting and stopping said motor, and mean solar time indicating means connected to said motor to be run thereby, said time indicating means indicating an assumed elapse of mean solar time from the beginning of the rotation of said sphere simulating means according to the above-mentioned proportional rate of rotation of said sphere simulating means.

41. In a device for teaching celestial navigation the combination of a dome-like structure in simulation of a portion of the celestial sphere, means comprising a synchronous motor for rotating said dome at a rate proportional to the rate of apparent rotation of the celestial sphere about the earth, means for starting and stopping said motor, and mean solar time indicating means connected to said motor to be run thereby, said time indicating means indicating an assumed elapse of mean solar time from the beginning of the rotation of said sphere according to the above-mentioned proportional rate of rotation of said dome.

42. In a device for teaching celestial navigation the combination of means simulating a portion of the celestial sphere, a constant speed synchronous motor arranged to rotate by means of a gear train said sphere simulating means through exactly 360° 59' in twenty-four hours, said gear train comprising ratios to increase the output of said motor by the proportion of the length of a solar day to a sidereal day, and mean solar time indicating means driven by said motor to indicate the amount of mean solar time of the running of said motor.

43. A device for teaching celestial navigation comprising means simulating a portion of the celestial sphere; means for rotating said sphere simulating means in simulation of the apparent rotation of the real celestial sphere about the earth occurring with an elapse of time; means for modifying said first-mentioned rotation in accordance with an assumed change in the longitudinal position of an observer, in simulation of the modification of the apparent rotation of the real celestial sphere about the earth occurring with an elapse of time caused by a change in an observer's longitudinal position upon the earth; time indicating means, said time indicating means indicating an assumed elapse of mean solar time from the beginning of the rotation of said sphere simulating means according to the rate of rotation of said sphere simulating means caused by said first-mentioned rotating means; and means for indicating the amount of rotation of said sphere caused by said modifying means.

44. A device for teaching celestial navigation comprising a dome-like structure in simulation of a portion of the celestial sphere; means for rotating said dome in simulation of the apparent rotation of the celestial sphere about the earth occurring with an elapse of time; means for modifying said first-mentioned rotation in accordance with an assumed change in the longitudinal position of an observer, in simulation of the modification of the apparent rotation of the real celestial sphere about the earth occurring with an elapse of time caused by a change in an observer's longitudinal position upon the earth; time indicating means, said time indicating means indicating an assumed elapse of time from the beginning of the rotation of said sphere simulating means according to the rate of rotation of said sphere simulating means caused by said first-mentioned rotating means; and means for indicating the amount of rotation of said sphere simulating means caused by said modifying means.

45. In a device for teaching celestial navigation the combination of means for simulating a portion of the celestial sphere, a constant speed motor arranged to rotate said sphere simulating means through exactly 360° 59' in twenty-four hours, a variable speed motor arranged to vary the speed of rotation of said sphere simulating means imparted thereto by said constant speed motor, and separate indicators associated with each of said motors for indicating the respective outputs thereof.

46. A device for teaching celestial navigation comprising means simulating a portion of the celestial sphere; means for rotating said sphere simulating means in simulation of the apparent rotation of the real celestial sphere about the earth occurring with an elapse of time; means for modifying said first-mentioned rotation in accordance with an assumed change in the longitudinal position of an observer, in simulation of the modification of the apparent rotation of the real celestial sphere about the earth occurring with an elapse of time caused by a change in an observer's longitudinal position upon the earth; time indicating means, said time indicating means indicating an assumed elapse of time from the beginning of the rotation of said sphere simulating means according to the rate of rotation of said sphere simulating means caused by said first-mentioned rotating means; means for indicating the amount of rotation of said sphere simulating means caused by said modifying means; and means for indicating the total amount of rotation of said sphere simulating means.

47. In a device for teaching celestial navigation the combination of means for simulating a portion of the celestial sphere, a constant speed motor arranged to rotate said sphere simulating means through exactly 360° 59' in twenty-four hours, a variable speed motor arranged to vary the speed of rotation of said sphere simulating means imparted thereto by said constant speed motor, separate indicators associated with each of said motors for indicating the respective outputs thereof, and a third indicator associated with said sphere simulating means for indicating the total amount of rotation thereof.

48. A device for teaching celestial navigation comprising means simulating a portion of the celestial sphere; means for rotating said sphere simulating means in simulation of the apparent rotation of the real celestial sphere about the earth occurring with an elapse of time; means for modifying said first-mentioned rotation in accordance with an assumed change in the longitudinal position of an observer, in simulation of the modification of the apparent rotation of the real celestial sphere about the earth occurring with an elapse of time caused by a change in an observer's longitudinal position upon the earth; means for rotating said sphere simulating means about an axis at right angles to the axis of said first-mentioned rotation in simulation of the apparent rotation of the real celestial sphere about the earth caused by a change in the latitudinal position of an observer; time indicating means, said time indicating means indicating an assumed elapse of time from the beginning of the rotation of said sphere simulating means according to the rate of rotation of said sphere simulating means caused by said first-mentioned rotating means; means for indicating the amount of rotation of said sphere simulating means caused by said modifying means; and means for indicating the amount of rotation of said sphere simulating means caused by said third-mentioned rotating means.

49. A device for teaching celestial navigation comprising means simulating a portion of the celestial sphere; means for rotating said sphere simulating means in simulation of the apparent rotation of the real celestial sphere about the earth occurring with an elapse of time; means for modifying said first-mentioned rotation in accordance with an assumed change in the longitudinal position of an observer, in simulation of the modification of the apparent rotation of the real celestial sphere about the earth occurring with an elapse of time caused by a change in an observer's longitudinal position upon the earth; means for rotating said sphere simulating means about an axis at right angles to said first-mentioned axis in simulation of the apparent rotation of the real celestial sphere about the earth caused by a change in the latitudinal position of an observer upon the earth; time indicating means, said time indicating means indicating an assumed elapse of time from the beginning of the rotation of said sphere simulating means according to the rate of rotation of said sphere simulating means caused by said first-mentioned rotating means; means for indicating the amount of rotation of said sphere simulating means caused by said modifying means; means for indicating the amount of said rotation of said sphere simulating means caused by said third-mentioned rotating means; and means for indicating the total amount of rotation of said sphere simulating means caused by said first two mentioned rotating means.

50. A device for teaching celestial navigation comprising the combination of means simulating a portion of the celestial sphere, said simulating means comprising a plurality of sources of light positioned about said sphere simulating means and visible from therewithin; means for limiting the effective observation area within said sphere simulating means in which a student navigator may place an instrument while taking an observation upon certain of said sources of light; an arcuate rail; means for suspending said sphere simulating means from said rail; and means for moving said sphere simulating means along said rail.

51. A device for teaching celestial navigation comprising the combination of means simulating a portion of the celestial sphere, said simulating means comprising a plurality of sources of light positioned about said sphere simulating means and visible from therewithin; and means for limiting the effective observation area within said sphere simulating means in which a student navigator may place an instrument while taking an observation upon certain of said sources of light; an arcuate rail; means for suspending said sphere simulating means from said rail; means for moving said sphere simulating means along said rail; and means for rotating said sphere.

52. In a device for teaching celestial navigation the combination of means simulating a portion of the celestial sphere, said sphere simulating means comprising a simulated celestial body including a source of light and means positioned with respect to said source of light so that said source of light is observable from a restricted area only in which a student may place an instrument while making observations upon said simulated celestial body.

53. In a device for teaching celestial navigation the combination of means simulating a portion of the celestial sphere, said sphere simulating means comprising a plurality of celestial body simulating objects capable of illumination positioned about said sphere, at least two of said objects being positioned so that light therefrom is observable from a restricted area only in which a student may place an instrument while making observations upon said two objects.

EDWIN A. LINK.